United States Patent
Austin et al.

(10) Patent No.: US 9,439,061 B2
(45) Date of Patent: Sep. 6, 2016

(54) SELECTIVE PRIORITIZATION OF VOICE OVER DATA

(75) Inventors: Mark Austin, Roswell, GA (US); Mario Kosseifi, Roswell, GA (US); Sheldon Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 800 days.

(21) Appl. No.: 13/117,792

(22) Filed: May 27, 2011

(65) Prior Publication Data

US 2012/0302223 A1 Nov. 29, 2012

(51) Int. Cl.
*H04M 3/00* (2006.01)
*H04W 8/18* (2009.01)
*H04W 48/18* (2009.01)

(52) U.S. Cl.
CPC ............... *H04W 8/18* (2013.01); *H04W 48/18* (2013.01)

(58) Field of Classification Search
USPC ....................................... 455/414.1, 418–420
See application file for complete search history.

(56) References Cited

U.S. PATENT DOCUMENTS

| | | | |
|---|---|---|---|
| 6,016,311 A | 1/2000 | Gilbert | |
| 7,509,129 B2 | 3/2009 | Sinivaara | |
| 8,346,274 B2 | 1/2013 | Sane et al. | |
| 2003/0128674 A1* | 7/2003 | Kong | H04B 7/264 370/320 |
| 2003/0224815 A1 | 12/2003 | Rodman | |
| 2005/0095986 A1* | 5/2005 | Hassan | H04W 16/14 455/67.13 |
| 2005/0250534 A1 | 11/2005 | Maurer | |
| 2006/0013164 A1 | 1/2006 | Paryani | |
| 2007/0042801 A1* | 2/2007 | Miyata | H04L 12/189 455/550.1 |
| 2008/0039106 A1 | 2/2008 | Wallentin et al. | |
| 2010/0054241 A1* | 3/2010 | Shah | H04L 45/00 370/389 |
| 2010/0165948 A1 | 7/2010 | Ore et al. | |
| 2010/0279679 A1 | 11/2010 | Young et al. | |
| 2011/0021183 A1* | 1/2011 | Garcia Cabezas | H04W 36/32 455/417 |
| 2011/0294485 A1 | 12/2011 | Slack | |
| 2012/0083264 A1 | 4/2012 | Ramasamy et al. | |
| 2012/0224552 A1* | 9/2012 | Feuersanger | H04L 5/0007 370/329 |
| 2012/0264397 A1 | 10/2012 | Meredith et al. | |

FOREIGN PATENT DOCUMENTS

GB 2337423 A * 11/1999 ............... H04Q 7/22

OTHER PUBLICATIONS

U.S. Office Action dated Dec. 5, 2012 in U.S. Appl. No. 13/088,731.
U.S. Appl. No. 13/088,731 Office Action dated May 21, 2013.
U.S. Appl. No. 13/088,731 Notice of Allowance dated Aug. 7, 2013.

* cited by examiner

*Primary Examiner* — Olumide T Ajibade Akonai
*Assistant Examiner* — Matthew Genack
(74) *Attorney, Agent, or Firm* — Hartman & Citrin LLC

(57) ABSTRACT

Systems, methods, and computer-readable media are described herein for allowing a user or a service provider to selectively prioritize voice communications over data communications. By selectively prioritizing voice communications over data communications, the number of dropped calls in the mobile telecommunications network can be significantly reduced.

17 Claims, 18 Drawing Sheets

SELECTIVE PRIORITIZATION OF VOICE OVER DATA

BACKGROUND

This application relates generally to providing voice and data communication in a mobile telecommunications network and, more particularly, to selectively prioritizing voice communications over data communications in a mobile telecommunications network.

Some mobile telecommunications networks, such as those based upon Universal Mobile Telecommunications System ("UMTS"), utilize a bearer service called a radio access bearer ("RAB") to establish voice and/or data connections between a mobile device and a core network. UMTS permits the simultaneous transmission of voice and data content over a special-purpose RAB called a multi-RAB (also called an "mRAB"). When a subscriber is using their mobile device for voice communications and the network has data to transmit to the mobile device, the network and the mobile device jointly establish an mRAB to support simultaneous transmission of voice and data content. Similarly, an mRAB can be established if the subscriber takes actions to initiate a data transfer, such as by initiating a download or launching an application that relies on a data connection to populate its content.

Communications over an mRAB are not without complications. For example, a mobile device using an mRAB for voice and data communications is required to supply sufficient uplink transmit power to support both the voice and data components of the mRAB. Under some conditions, such as when the mobile device is approaching the edge of network coverage, the mobile device may use all or at least a majority of its available uplink transmit power to maintain acceptable voice quality for a voice call. When an mRAB is invoked to transfer data, the radio link budget is impaired by several decibels, at which point the mobile device can no longer support both the voice and data components. If either component fails, the mRAB is torn down, resulting in a dropped call. The subscriber is likely unaware of the underlying mechanisms that forced their call to be dropped, particularly for scenarios in which a background service, such as an email push, forced establishment of the mRAB while the subscriber was on the call.

Recent performance trends in UMTS-based networks have shown that the number of dropped voice calls due to mRAB connections can be several times the number of dropped voice calls when a voice-only RAB is used. Mobile network operators may want to promote their competitive advantage in offering wireless service that allows simultaneous voice and data. In doing so, however, these mobile network operators may also exacerbate the aforementioned problems leading to a higher frequency of dropped calls and, as a result, reduced consumer confidence, bad press, decreased subscriber retention, and revenue loss.

SUMMARY

Computer readable media are described herein for allowing a user or a service provider to selectively prioritize voice communications over data communications. By selectively prioritizing voice communications over data communications, the number of dropped calls in the mobile telecommunications network can be significantly reduced.

According to one aspect presented herein, a computer storage medium has computer readable instructions stored thereupon that, when executed by a mobile device, cause the mobile device to receive a selection of a voice prioritized option and conditionally deny data access in response to receiving the selection of the voice prioritized option. In some embodiments, conditionally denying data access includes conditionally limiting data access. For example, data access may be limited by changing the data rate available to the mobile device and/or allowing only certain types of data. For example, text or other low-capacity data may be allowed while video content or other high-capacity data is denied. Also, for example, data access may be limited by location such that if the mobile device is located in a certain location, the mobile device is limited data access to all or some data types.

According to another aspect presented herein, a computer storage medium has computer readable instructions stored thereupon that, when executed by a mobile device, cause the mobile device to receive a value for a voice priority setting from a server, store the value for the voice priority setting, and conditionally deny data access in accordance with the value stored for the voice priority setting.

According to another aspect presented herein, a computer storage medium has computer readable instructions stored thereupon that, when executed by a mobile device, cause the mobile device to establish a voice call, measure a statistic at the mobile device during the call, tear down the voice call, and report the statistic to a remote server.

Other systems, methods, and/or computer readable media according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to various aspects for selectively prioritizing voice calls over data communications in a mobile telecommunications network. While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
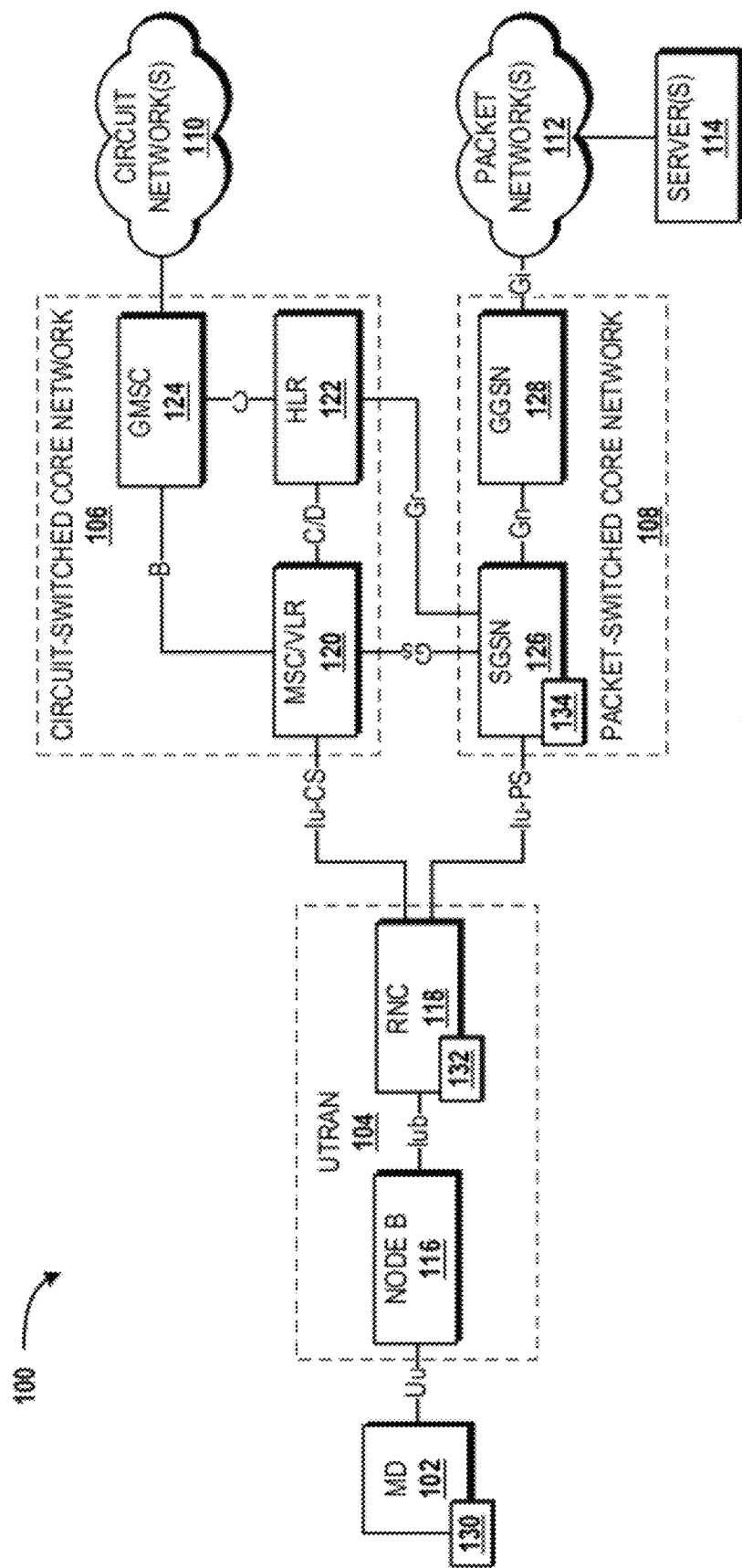
FIG. 1 is a network architecture diagram schematically illustrating an exemplary operating environment for implementing various embodiments presented herein.

Referring now to FIG. 1, aspects of a network 100 for various embodiments presented herein will be described. The network 100 is illustrated and described in context of a Universal Mobile Telecommunications System/Universal Mobile Telephone System ("UMTS") network capable of providing simultaneous voice and data communications. Although various aspects are disclosed in this particular context, those skilled in the art will appreciate the applicability of many of the disclosed aspects to other mobile telecommunications technologies that support simultaneous voice and data communications, and/or technologies such as High-Speed Packet Access ("HSPA") and HSPA+ that enhance or build upon the capabilities of UMTS by providing higher data transfer rates or other features. It is contemplated that the network 100 may not include all of the network elements shown in FIG. 1, may include other network elements that are not explicitly shown in FIG. 1, may include multiples of the network elements that are explicitly shown in FIG. 1, and/or may utilize an architecture completely different than that shown in FIG. 1.

The network 100 includes a mobile communications device ("MD") 102, such as a cellular telephone or a computer configured with an integrated or an external, removable UMTS access component that facilitates wireless communication with the network 100. In some embodiments, the UMTS access component is a cellular telephone that is in wired or wireless communication with the computer to facilitate a tethered data connection to the network 100. In other embodiments, the UMTS access component includes a wireless transceiver to send and receive data from the network 100 and a universal serial bus ("USB") or another communication interface for connection to the computer to enable tethering. In any case, the MD 102 is configured to wirelessly communicate with a UMTS Terrestrial Radio Access Network ("UTRAN") 104 via a Uu radio interface, as shown in the illustrated embodiment. An exemplary device architecture of the MD 102 is illustrated and described herein below with reference to FIG. 16.

The UTRAN 104 is in communication with a circuit-switched core network ("CS CN") 106 and a packet-switched core network ("PS CN") 108 via an Iu-CS interface and an Iu-PS interface, respectively. The CS CN 106 is also in communication with a circuit network 110, such as a Public Switched Telephone Network ("PSTN"), an Integrated Services Digital Network (ISDN), or other circuit-switched network. The PS CN 108 is also in communication with a packet network 112, such as an internet, an intranet, or other packet-switched network.

The packet network 112 is also in communication with a server 114. The server 114 is configured to provide data content to the PS CN 108 for delivery to the MD 102 over the UTRAN 104. The content provided by the server 114 may be content requested and subsequently downloaded by the MD 102 (e.g., a data pull operation) or may be content pushed to the MD 102. The server 114 may host content associated with a particular website and/or a particular service. Exemplary services that may be provided by the server 114 include an email service, a social networking service, a professional networking service, a news service, an online gaming service, an audio or video streaming service, an application software download service, a music or video download service, a web application service, or any other type of service that provides content to mobile devices.

Referring again to the UTRAN 104, as illustrated, the UTRAN 104 includes a node B 116 and a radio network controller ("RNC") 118. The node B 116 includes one or more transceivers for transmission and reception of data across the Uu radio interface. The node B 116 is the terminating node of the UTRAN 104 for the Uu radio interface. The node B 116 is in communication with the RNC 118 via an Iub interface. The RNC 118 is configured to allocate radio resources to the MD 102, apply codes to describe channels in accordance with Wideband Code Division Multiple Access ("W-CDMA") protocol, and control handovers between the node B 116 and one or more other node Bs (not shown). The RNC 118 also acts a concentrator, so that many different low capacity connections to the node B 116 become reduced to a smaller number of connections towards the CS CN 106 and the PS CN 108 via the Iu-CS and Iu-PS interfaces, respectively.

The UTRAN 104 and, particularly, the RNC 118 communicates with the CS CN 106 via a mobile switching center ("MSC") 120 using the Iu-CS interface. The MSC 120 is configured to function as a telecommunications switch for voice calls in the network 100. The MSC 120 is in communication with location databases, such as a visiting location register ("VLR") and a home location register ("HLR") 122. The VLR may be logically associated with the MSC 120, as illustrated, or may be provided as a separate network element in communication with the MSC 120. The VLR is a database configured, in part, to store all subscriber data that is required for call processing and mobility management for mobile subscribers that are currently located in an area controlled by the MSC 120. The HLR 122 is in communication with the MSC 120 and the VLR via a C interface and a D interface, respectively (shown together for convenience as a C/D interface). The HLR 122 is a database configured, in part, to provide routing information for mobile-terminated calls and various messaging communications. The HLR 122 is also configured to maintain subscriber data that is distributed to the relevant VLR or elements of the PS CN 108 through an attach process and to perform mobility management procedures, such as location area and routing area updates.

The HLR 122 may be logically associated with an authentication center (not shown) that is configured to authenticate a universal subscriber identity module ("USIM", also not shown) of the MD 102 when the MD 102 attempts to connect to the network 100, such as during a power-on procedure. Once authenticated, the HLR 122 is permitted to manage the USIM and services provided to the MD 102. The authentication center is also configured to generate an encryption key that is used to encrypt all wireless communications between the MD 102 and the core networks 106, 108.

The MSC 120 is also in communication with a gateway MSC ("GMSC") 124 via a B interface. The HLR 122 is in communication with the GMSC 124 via a C interface to obtain routing information for mobile-terminated calls originating from fixed network devices, such as landline telephones operating via the circuit network 110. The GMSC 124 is configured, in part, to provide an edge function within the CS CN 106 to the circuit network 110. In particular, the GMSC 124 is configured to terminate signaling and traffic from the circuit network 110 and convert the signaling and traffic to protocols employed by the CS CN 106. The GMSC 124 may also provide gateway functions of the network 100 to another public land mobile network ("PLMN", not shown).

The CS CN 106 is in communication with the PS CN 108 via the MSC 120 and the HLR 122. In particular, the MSC 120 and the HLR 122 are in communication with a serving General Packet Radio Service ("GPRS") support node ("SGSN") 126 via a Gs interface and a Gr interface, respectively. The SGSN 126 records and tracks the location of the MD 102 in the network 100 and provides security and access control functions for packet-switched data connections within the network 100. The SGSN 126 is in communication with the RNC 118 via the Iu-PS interface and a gateway GPRS support node ("GGSN") 128 via a Gn interface. The SGSN 126 may also provide gateway functions of the PS CN 108 to another PLMN (not shown) via a Gp interface (also not shown).

The GGSN 128 is configured, in part, to provide an edge routing function to the packet network 112 via a Gi interface. The GGSN 128 is configured to receive data from the packet network 112 and provide it to the SGSN 126 for delivery to the MD 102 over the UTRAN 104. The GGSN 128 also provides firewall and filtering functionality for the PS-CN 108.

The CS CN 106, the UTRAN 104, and the MD 102 are configured to jointly negotiate the establishment of a voice-only RAB ("vRAB"), for example, to facilitate voice communications between the MD 102 and another device. In some embodiments, a vRAB is established in response to a mobile-initiated or a mobile-terminated call directed to or received from another device (not shown) operating within the network 100, another PLMN, or the circuit network 110. In any case, a vRAB may be established according to known vRAB establishment procedures, after which voice communications between the MD 102 and the other device can be exchanged, at least in part, over the vRAB. It is also contemplated that the vRAB may be configured to facilitate a conference call, wherein the MD 102 is one of three or more devices participating in the conference call.

The PS CN 108, the UTRAN 104, and the MD 102 are configured to jointly negotiate the establishment of a data-only RAB ("dRAB"), for example, to facilitate data communications between the MD 102 and the server 114. The dRAB may be established according to known dRAB establishment procedures in response to a pull or push operation initiated by the MD 102 or the server 114. Data communications between the MD 102 and the server 114 can then be exchanged, at least partially, over the dRAB. The initiation of a push or pull operation by the MD 102 or the server 114 is referred to herein, at times, as a data request. Generally, though, a data request is any message sent by an entity of the network 100 to another entity of the network 100 in an attempt to access or deliver data content.

The CS CN 106, the PS CN 108, the UTRAN 104, and the MD 102 are also configured to jointly negotiate the establishment of a multi-RAB ("mRAB"), for example, to facilitate voice communications between the MD 102 and another device, and to facilitate data communications between the MD 102 and the server 114. In some embodiments, an mRAB is established during a voice session occurring over a vRAB. In these embodiments, after the mRAB is established, the voice session is transferred to the mRAB and the vRAB is torn down. A data session can then be simultaneously conducted with the voice session over the mRAB. After the data session ends, a new vRAB may be established and the voice session may be transferred to the new vRAB. Alternatively, the voice session remains on the mRAB until completion.

In other embodiments, an mRAB is established during a data session occurring over a dRAB. In these embodiments, after the mRAB is established, the data session is transferred to the mRAB and the dRAB is torn down. A voice session can then be simultaneously conducted with the data session over the mRAB. After the data session ends, a new dRAB may be established and the data session may be transferred to the new dRAB. Alternatively, the data session remains on the mRAB until completion.

Data requests originating from the MD 102 may be device-initiated or user-initiated. In some embodiments, a device-initiated data request is a data request generated automatically by the MD 102 in response to instructions received from an application residing on the MD 102. In some embodiments, the MD 102 receives no direct user input through the application or otherwise to prompt generation of the data request. In other embodiments, the MD 102 receives indirect user input, such as via preference settings or other set and forget type settings, from a user of the MD 102. These settings may include, but are not limited to, the frequency by which an application requests a data connection to download content. A user may desire to establish such a setting to mitigate data usage by the application, thereby potentially reducing data usage costs. The frequency by which the application requests a data connection to download content may alternatively be set by the application developer, the mobile network operator providing the network 100, another mobile network operator, another party, or another entity.

In some embodiments, a user-initiated data request is a data request generated by the MD 102 in response to a direct user input. In some embodiments, a direct user input is a user input that causes an application to request a data connection. For example, a user may launch an application that at least temporarily requires a data connection. In this example, the application may require the data connection to search for available updates, download updates, download content for user consumption, or otherwise use the data connection to provide some functionality to the user without the user providing an input in excess of launching the application. As an additional example, a user may launch an application that only requires a data connection for a particular feature or mode within the application, such as a game application that does not require a data connection for some features (e.g., single player modes, menu navigation, etc.) but requires a data connection for other features (e.g., multiplayer modes, to download optional updates, to download optional additional content, etc.). Other examples of user inputs that would prompt an application to request a data connection include, but are not limited to, a search query within an application (e.g., a web browser, an email client, an application store, a music or video store, etc.), a user-initiated data pull that prompts the application to initiate a download operation, a web page refresh, an email refresh, an audio or video streaming request, a multimedia messaging service ("MMS") operation, and the like.

In some embodiments, data requests originating from the network 100 include an action taken by an entity external to the MD 102 to invoke an operation on the MD 102 that at least temporarily requires a data connection. For example, data requests originating from the network 100 may originate from the GGSN 128 in response to the GGSN 128 receiving instructions from the server 114 to deliver content to the MD 102 in accordance with a data push operation. The server 114 may be configured to push any type of content to the MD 102.

Regardless of the origin of the data request (i.e., the MD 102 or an entity external to the MD 102 within the network 100), in some embodiments, the data request includes a packet data protocol ("PDP") message used during a PDP activation procedure between the MD 102 and the PS CN 108 as a step towards creation of a dRAB or an mRAB depending upon the scenario. In particular, the data request, in some embodiments, includes a PDP context activation request (i.e., an Activate PDP Context message). For network-initiated data requests, a PDP context activation request is generated by and sent from the GGSN 128 to the SGSN 126 as an initial operation towards the creation of a PDP context between the MD 102 and the SGSN 126. For device-initiated or user-initiated data requests, a PDP context activation request is generated by and sent from the MD 102 to the SGSN 126 towards the creation of a PDP context between the MD 102 and the SGSN 126. For either scenario, after a PDP context is established between the MD 102 and the SGSN 126, a RAB (e.g., a dRAB or an mRAB) is established according to RAB establishment procedures. Each PDP context has its own RAB (between the MD 102 and the SGSN 126) and tunnel (between the SGSN 126 and the GGSN 128). Other details regarding the establishment of a PDP context and a RAB, particulary, the messaging that occurs between elements of the network 100 during a PDP context activation sequence and a RAB establishment procedure, are known to those skilled in the art and are beyond the scope of this disclosure.

In the illustrated embodiment of FIG. 1, the MD 102, the RNC 118, and the SGSN 126 each have an application program module associated therewith. In particular, the MD 102 is associated with an MD application 130 (also referred to herein at times as "the mRAB decision application 130"), the RNC 118 is associated with an RNC application 132, and the SGSN 126 is associated with an SGSN application 134. In some embodiments, the mRAB decision application 130 of the MD 102 is configured to perform operations towards a determination of whether an mRAB should be established, as described in greater detail herein, for example, with reference to FIGS. 2-6. In some embodiments, the MD application 130 is configured to allow a user to prioritize voice over data during a voice call. This is described in greater detail herein with reference to FIG. 11. In some embodiments, the MD application 130 is configured to receive instructions from a remote server specifying the conditions under which voice prioritization should take place. This is described in greater detail herein with reference to FIG. 14. In some embodiments, the MD application 130 includes a measurement application to conduct measurement described herein below with reference to FIG. 15. Other embodiments of the MD application 130 are described herein.

Figure 7:
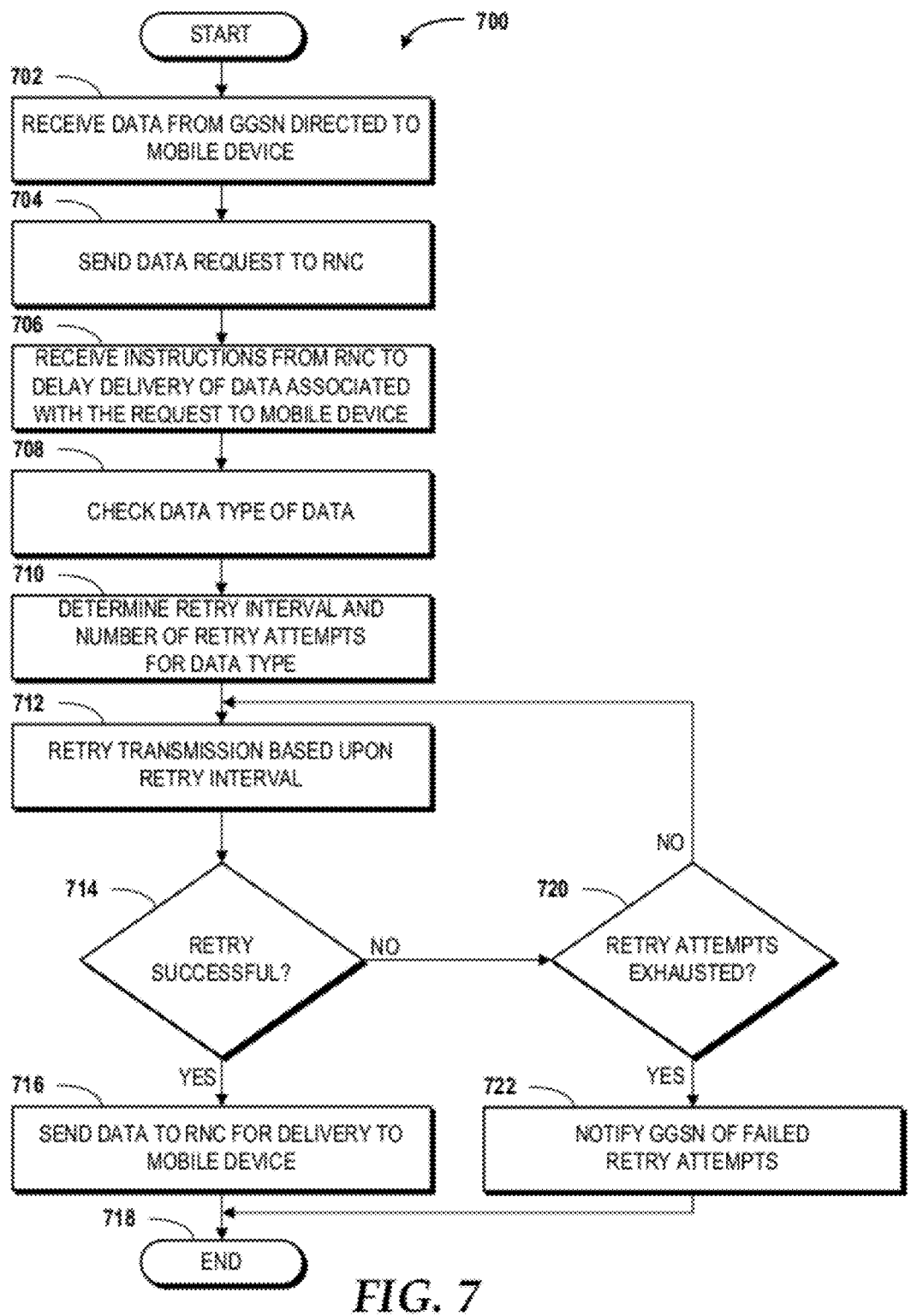
FIG. 7 is a flow diagram showing aspects of a method for operating a serving general packet radio service support node to selectively establish an mRAB, according to an exemplary embodiment.
Figure 8:
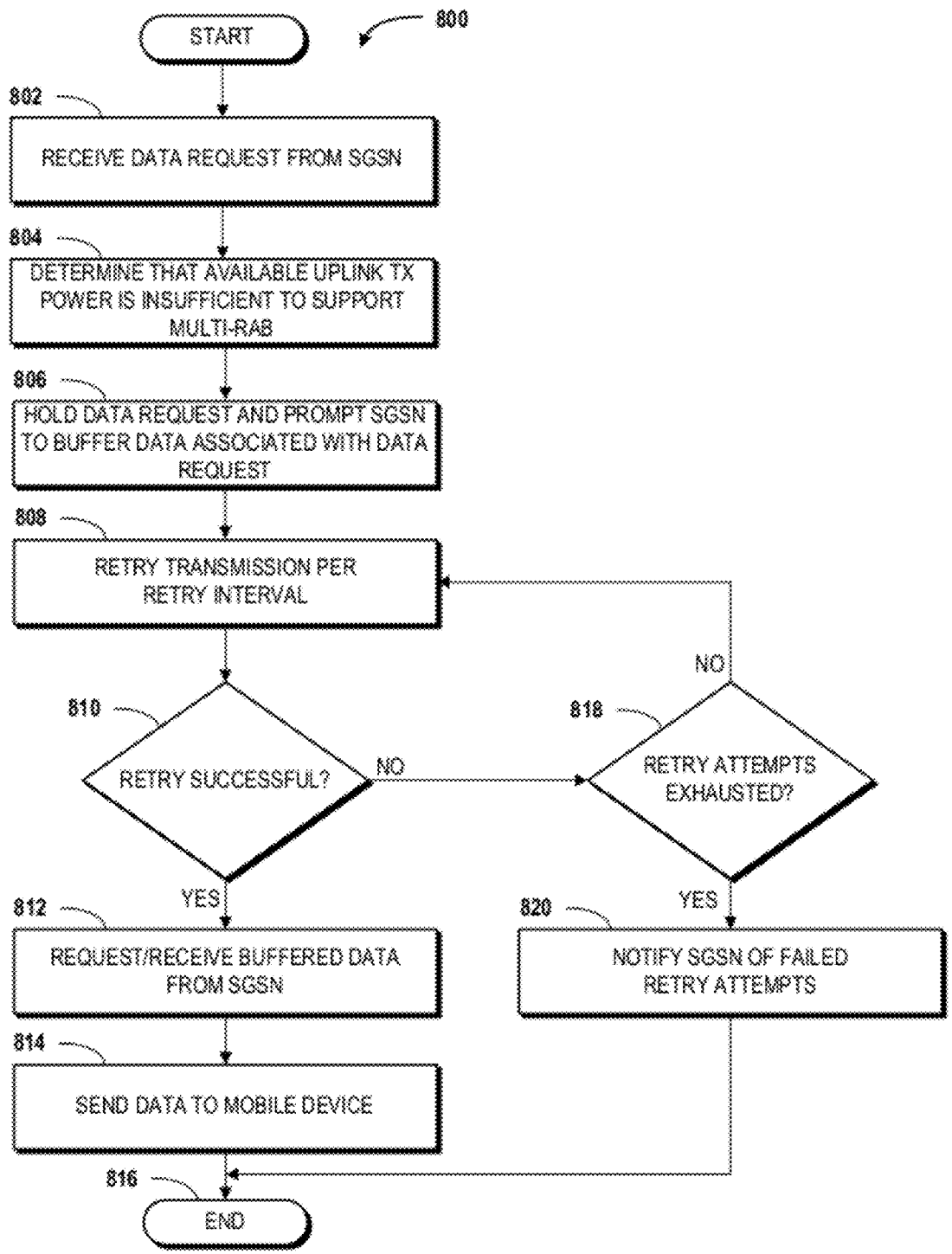
FIG. 8 is a flow diagram showing aspects of a method for operating a radio network controller to selectively establish an mRAB, according to an exemplary embodiment.

In some embodiments, the RNC application 132 is configured to hold a data request received from the SGSN 126, prompt the SGSN 126 to buffer data associated with the data request, and retry transmission of the data request to the MD 102 based upon a retry interval, as described in greater detail herein, for example, with particular reference to FIG. 8. In some embodiments, the SGSN module 134 is configured to delegate a retry interval by which the SGSN 126 should retry attempts to send data received from the GGSN 128 to the MD 102 over the UTRAN 104, as described in greater detail below, for example, with reference to FIG. 7.

Figure 2:
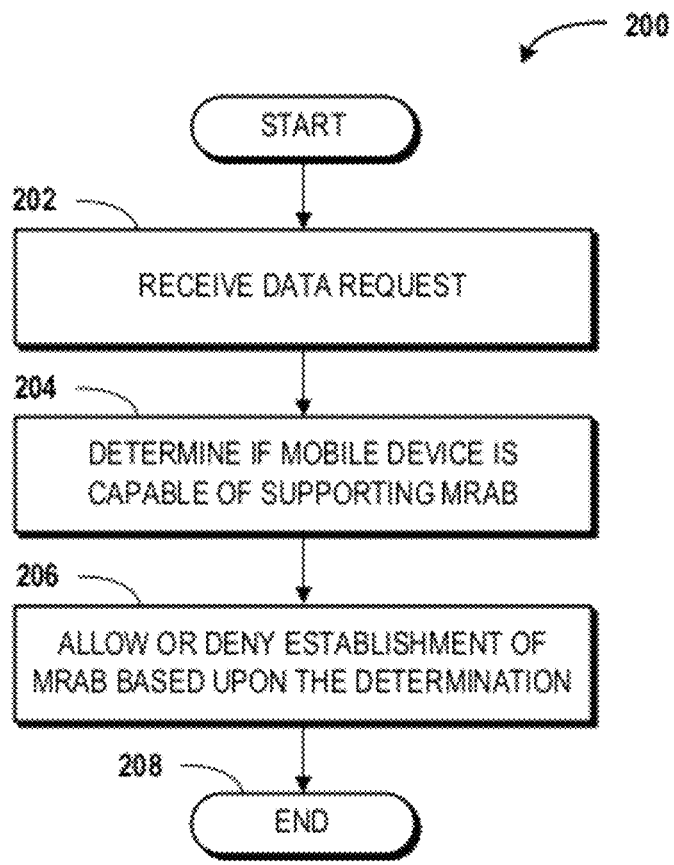
FIG. 2 is a flow diagram showing aspects of a method for selectively establishing an mRAB, according to an exemplary embodiment.

Turning now to FIG. 2, aspects of a method 200 for selectively establishing an mRAB will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, one or more of the network elements described above with reference to FIG. 1, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the MD 102, the RNC 118, and/or the SGSN 126, for example, by execution, respectively, of computer-executable instructions contained in the mRAB decision application 130, the RNC application 132, and/or the SGSN application 134. It should be understood that these embodiments are exemplary, and should not be viewed as being limiting in any way. The method 200 is now described with reference to FIG. 2.

The method 200 begins at operation 202, wherein the MD 102 receives a data request. The data request may be a device-initiated, user-initiated, or network-initiated data request, as described in greater detail above with reference to FIG. 1. For a device-initiated or user-initiated data request, the receipt of the data request is internal to the MD 102. That is, for example, the MD 102 may receive a data request from an application executing on the MD 102. For a network-initiated data request, the receipt of the data request is by a transceiver (shown in FIG. 16) of the MD 102.

From operation 202, the method 200 proceeds to operation 204, wherein it is determined if the MD 102 is capable of supporting an mRAB. The mRAB decision application 130 (shown in FIG. 1) may be executed by the MD 102 to make this determination.

In some embodiments, the determination made in operation 204 is based upon whether the MD 102 is currently engaged in a voice communication. If the MD 102 is currently engaged in a voice communication, the MD 102 may determine that it is not capable of supporting an mRAB. Otherwise, if the MD 102 is not currently engaged in a voice communication, the MD 102 may determine that the MD 102 is capable of supporting an mRAB. Although not shown in the illustrated embodiment, instead of a data request, the MD 102 may receive an incoming call. In this case, the determination made in operation 204 is based upon whether the MD 102 is currently engaged in a data communication.

In other embodiments, the determination made in operation 204 is based at least partially upon one or more statistics measured by the MD 102 and a comparison of the measured statistics to a thresholding algorithm. The one or more statistics measured by the MD 102 may include, but are not limited to, an uplink transmit ("Tx") power (i.e., from the MD 102 to the node B 116), a downlink received ("Rx") power (i.e., from the node B 116 to the MD 102), and/or a number of power-up commands received by the MD 102 from the node B 116. In some embodiments, these statistics are measured by a standalone measuring application that is in communication with the mRAB decision application 130. In these embodiments, the measuring application provides the measured statistics to the mRAB decision application 130 so that the mRAB decision application 130 can make the determination of operation 204. In some embodiments, the measuring application is a diagnostics application configured to perform diagnostic operations in addition to measuring statistics. In other embodiments, the statistics are measured directly by the mRAB decision application 130. In any case, the statistics are compared to a thresholding algorithm to determine if the MD 102 is capable of supporting an mRAB.

The thresholding algorithm, in some embodiments, employs a threshold value that, when reached or exceeded, causes the mRAB decision application 130 to determine that the MD 102 is incapable of supporting an mRAB. For example, a threshold may be set to 75% of a maximum uplink Tx power of the MD 102. When the measured uplink Tx power (e.g., instantaneous or mean over a particular time period) of the MD 102 reaches or exceeds a certain percentage (e.g., 75%) of the maximum uplink Tx power, the mRAB decision application 130 determines that it is incapable of supporting an mRAB. The thresholding algorithm may alternatively consider an available uplink Tx power of the MD 102 which, in the above example, would be 25%. Thresholds may also be set in terms of decibels.

It is contemplated that the thresholding algorithm may employ a learning model by which the MD 102 adjusts the threshold value depending upon various radio conditions that require more or less power. For example, the MD 102 may require less uplink Tx power to support an mRAB when the MD 102 is located in a rural or suburban environment than when the MD 102 is located in an urban environment due to the prevalence of buildings, traffic, and other obstacles that imped the propagation of radio signals in urban environments. The learning model may adjust the threshold value to require a lower percentage of the maximum uplink Tx power when in certain environments. For example, the MD 102 may, on average during a voice session, be using X percent of a total transmit power Y to maintain the voice session. X may fluctuate higher or lower due to various factors such as location type (e.g., urban, suburban, or rural; indoor or outdoor), usage scenario (e.g., time of day, day of week, etc.), handset orientation, user mobility, network loading, human-made noise, distance from base station (e.g., the node B 116), signal fading and other signal propagation effects, and the like. Accordingly, the threshold value may be adjusted to compensate for such factors. The thresholding algorithm may alternatively be viewed in terms of decibels ("dB") or dBm instead of percentages.

It is also contemplated that the thresholding algorithm may employ a weighting function that utilizes multiple statistics (e.g., uplink Tx power and downlink Rx power), each weighted by a certain factor to calculate a weighted result that is used by the thresholding algorithm to determine whether the MD 102 is capable of supporting an mRAB. Other variations of a thresholding algorithm are described herein below with reference to the other FIGURES.

It should be understood that while the MD 102 may, at times, be capable of supporting an mRAB, doing so would increase the probability of an mRAB failure, potentially resulting in a tear down of the mRAB and a dropped call. Accordingly, determining if the MD 102 is capable of supporting an mRAB, in some embodiments, is an evaluation of a risk merit. That is, an evaluation of the risk of a dropped call if an mRAB is to be established given the current radio conditions being experienced by the MD 102 and the importance of the data prompting the establishment of the mRAB. In some instances, the risk of a dropped call is tolerable for data that is deemed important to the user, the network 100, the mobile network operator providing the network 100, another mobile network operator, another party, or another entity. For example, from a user perspective, navigation data may be considered important and worth the risk of potentially dropping a voice call. By contrasting example, an email push may be less crucial than navigation data and, as such, not worth the risk of potentially dropping a voice call.

In consideration of the determination of operation 204 as a risk merit evaluation, it is contemplated that the MD 102 can store priority data for various data types and/or various applications. For example, the MD 102 may include priority data that instructs the MD 102 to establish an mRAB for certain data types and/or applications based upon their priority level even if the determination of operation 204, under normal conditions, yields a result that the MD 102 is incapable of supporting an mRAB. The priority data may be globally set for a data type such that any application that uses the data type is permitted to access a data connection in accordance with a priority level established for the data type. Alternatively, the priority data may be set on a per application basis such that the priority level of the application controls. The priority data may be established by a user, a mobile network operator, a third party, or an entity. In some embodiments, the mobile network operator generates and sends a priority data file to the MD 102, so that the mobile network operator can control what data types and/or applications are permitted to request a data connection under certain radio conditions (e.g., under certain threshold values).

From operation 204, the method 200 proceeds to operation 206, wherein the MD 102 allows or denies establishment of an mRAB based upon the determination made in operation 204. In some embodiments, the MD 102 notifies the user that a data connection is unavailable if establishment of an mRAB is denied, as will be described in greater detail below with reference to FIG. 9. In other embodiments, the user is given the option to override the decision made by the MD 102 to deny establishment of an mRAB, as will be described in greater detail below with reference to FIG. 10. From operation 206, the method 200 proceeds to operation 208. The method 200 ends at operation 208.

Figure 3:
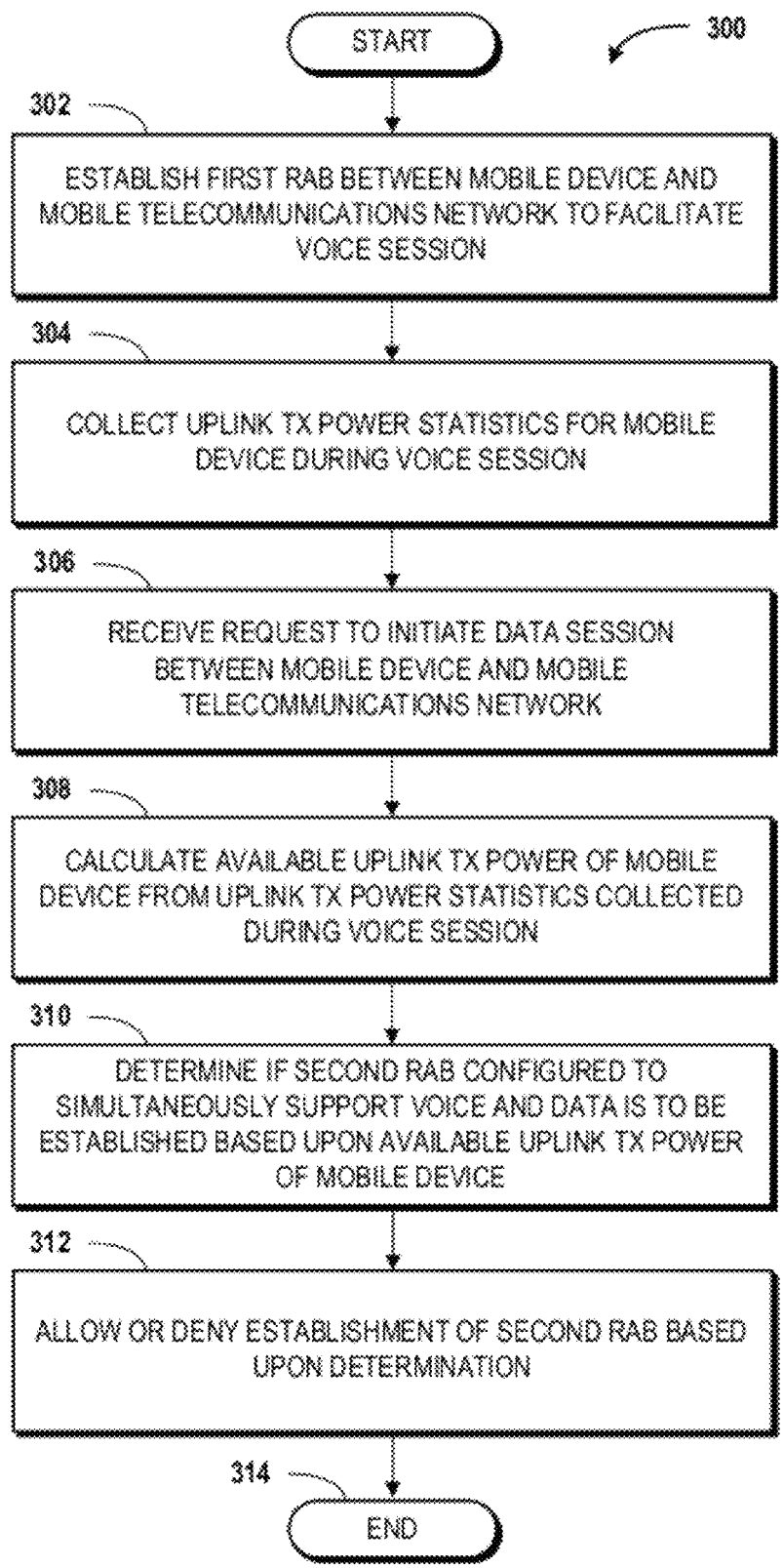
FIG. 3 is a flow diagram showing aspects of another method for selectively establishing an mRAB, according to an exemplary embodiment.

Turning now to FIG. 3, aspects of a method 300 for selectively establishing an mRAB based at least partially on an available uplink Tx power of the MD 102 will be described in detail. The method 300 begins at operation 302, wherein a first RAB (e.g., a vRAB) is established between the MD 102 and the network 100 to facilitate a voice session. The first RAB may be established in response to a mobile-initiated or a mobile-terminated call directed to or received from another device operating within the network 100, another PLMN, the circuit network 110, or the packet network 112. In any case, the first RAB is established and the voice session between the MD 102 and the other device is carried out. It is also contemplated that the first RAB may be configured to facilitate a conference call, wherein the MD 102 is one of three or more devices participating in the voice session.

From operation 302, the method 300 proceeds to operation 304, wherein uplink Tx power statistics for the MD 102 are collected during the voice session. In some embodiments, establishment of the voice session prompts the mRAB decision application 130 to begin, or instruct another application resident on the MD 102 (e.g., a measuring application) to begin measuring the uplink Tx power of the MD 102. The Tx power statistics may be collected at any periodicity or intermittently, and for any duration up to and including the entirety of the voice session.

From operation 304, the method 300 proceeds to operation 306, wherein the MD 102 receives a request to initiate a data session between the MD 102 and the network 100. The request received by the MD 102 may be a user-initiated request, a device-initiated request, or a network-initiated request in accordance with any of the embodiments described above.

From operation 306, the method 300 proceeds to operation 308, wherein the mRAB decision application 130 calculates an available Tx power of the MD 102 from the Tx power statistics collected during the operation 304. From operation 308, the method 300 proceeds to operation 310, wherein the mRAB decision application 130 determines if a second RAB (e.g., an mRAB) configured to simultaneously support voice and data is to be established based upon the available Tx power of the MD 102 calculated in operation 308. From operation 310, the method 300 proceeds to operation 312, wherein the mRAB decision application 130 allows or denies establishment of the second RAB based upon the determination. From operation 312, the method 300 proceeds to operation 314. The method 300 ends at operation 314.

Figure 4:
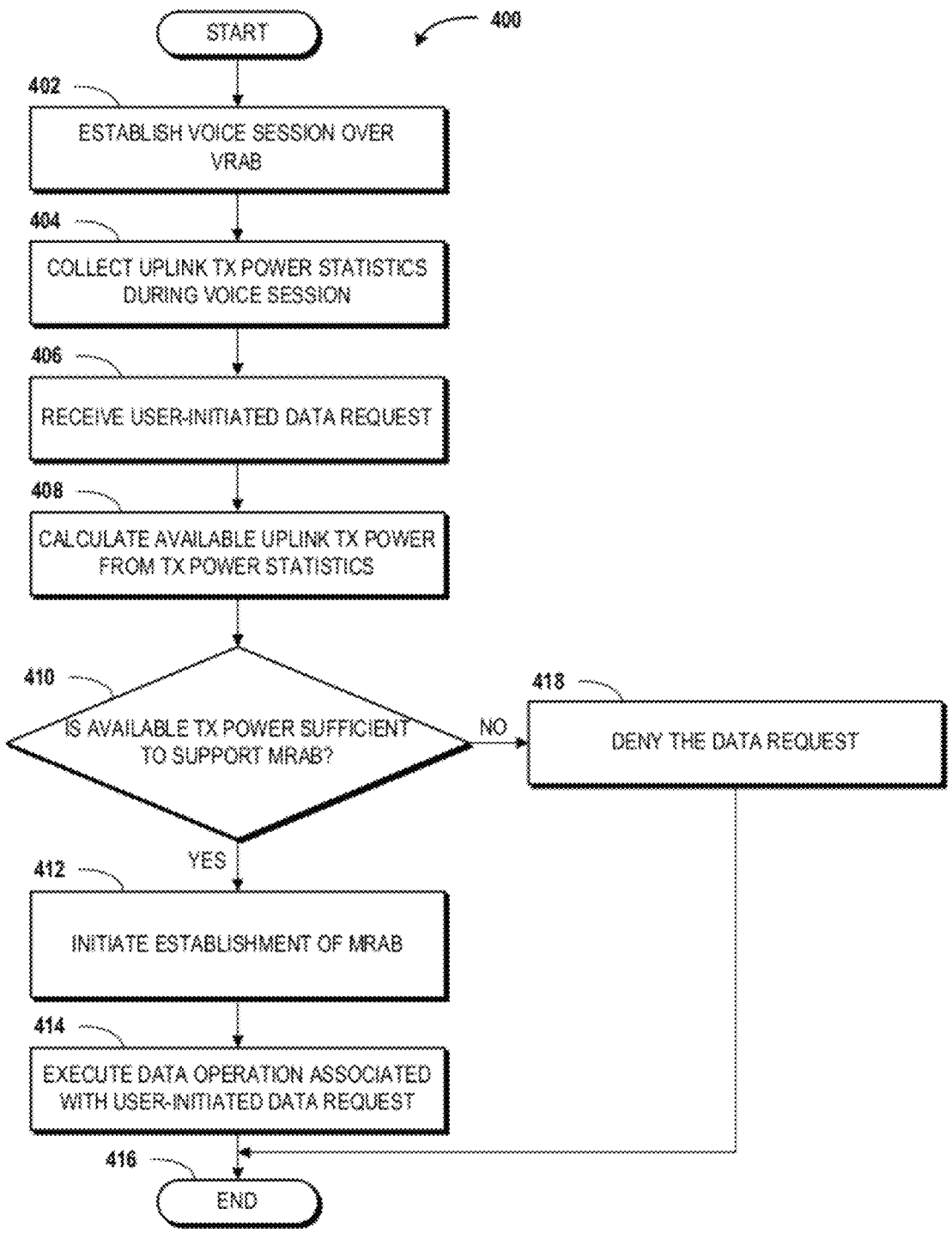
FIG. 4 is a flow diagram showing aspects of a method for selectively establishing an mRAB in response to a user-initiated data request, according to an exemplary embodiment.

Turning now to FIG. 4, aspects of a method 400 for selectively establishing an mRAB in response to a user-initiated data request will be described in detail. The method 400 begins and proceeds to operation 402, wherein the MD 102 establishes a voice session over a vRAB with the network 100. From operation 402, the method 400 proceeds to operation 404, wherein the mRAB decision application 130 collects uplink Tx power statistics during the voice session. From operation 404, the method proceeds to operation 406, wherein the MD 102 receives a user-initiated data request, such as a user-initiated data request described above with reference to FIG. 1. Alternatively, at operation 406, the MD 102 may receive a device-initiated data request. From operation 406, the method 400 proceeds to operation 408, wherein the mRAB decision application 130 calculates an available Tx power from the Tx power statistics collected during the operation 404.

From operation 408, the method 400 proceeds to operation 410, wherein the mRAB decision application 130 determines if the available Tx power calculated in operation 408 is sufficient to support an mRAB. This determination may be based upon a thresholding algorithm, such as described above with reference to FIG. 2. If it is determined at operation 410 that the available Tx power is sufficient to support an mRAB, the method 400 proceeds to operation 412, wherein the MD 102 initiates the establishment of an mRAB, for example, by generating a PDP context activation request and sending the PDP context activation request to the SGSN 126. The MD 102 and the SGSN 126 carry out the remainder of a PDP context activation procedure and an mRAB establishment procedure. After an mRAB is established, the voice session can be transferred to the mRAB and the vRAB can be torn down.

From operation 412, the method 400 proceeds to operation 414, wherein the MD 102 executes a data operation associated with the user-initiated data request. For example, the MD 102 may initiate a data download, request a refresh of data content, initiate a search query, or otherwise utilize the data connection afforded by the mRAB. From operation 414, the method proceeds to operation 416. The method 400 ends at operation 416.

If it is determined at operation 410 that the available Tx power is insufficient to support an mRAB, the method 400 proceeds to operation 418, wherein the mRAB decision application 130 denies the data request. Denial of the data request may be accompanied by a notification to the user, as described in greater detail below with reference to FIG. 9. Alternatively, denial of the data request may be accompanied by an override option that is presented to the user, as described in greater detail below with reference to FIG. 10. From operation 418, the method 400 proceeds to operation 416. The method 400 ends at operation 416.

Figure 5:
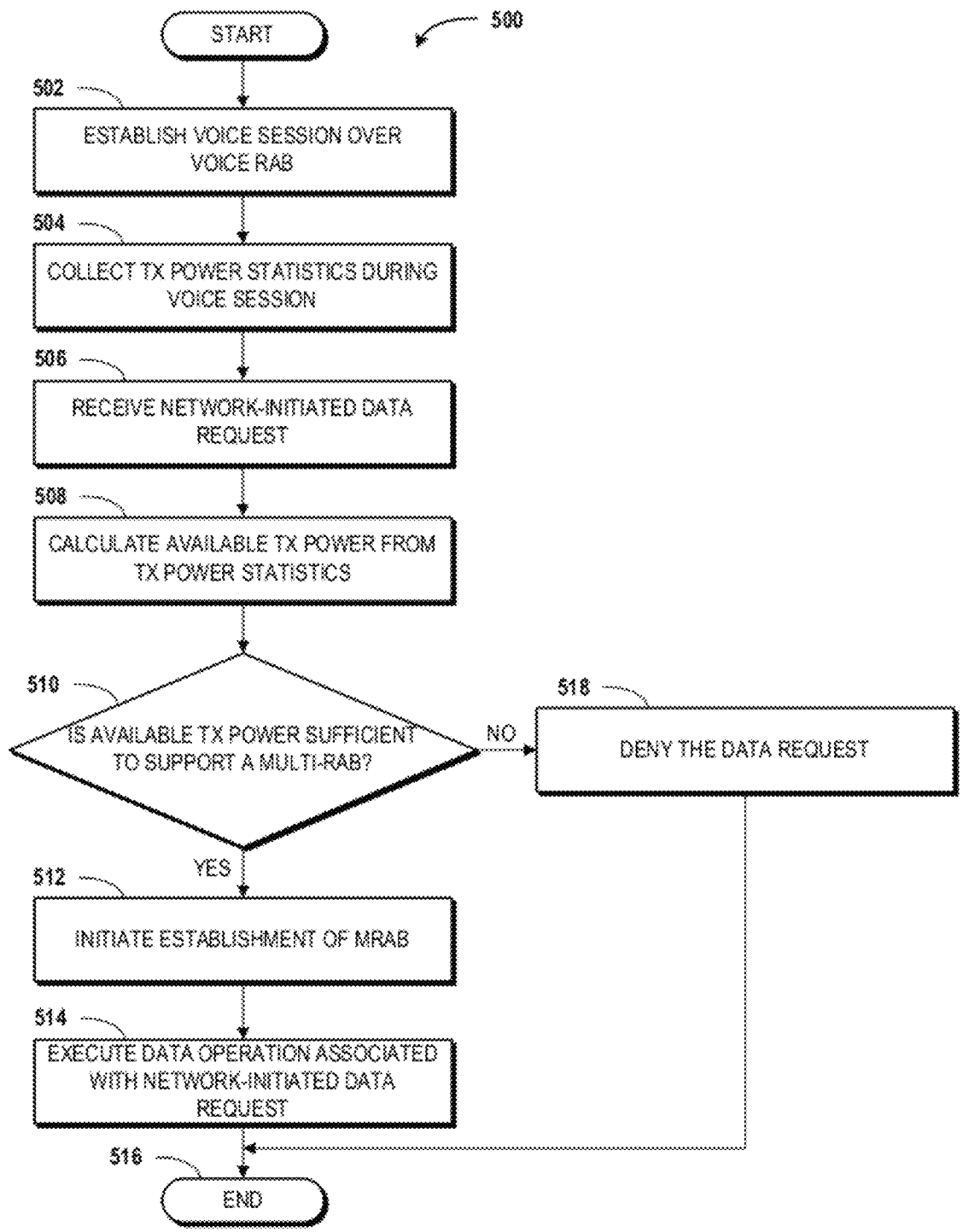
FIG. 5 is a flow diagram showing aspects of a method for selectively establishing an mRAB in response to a network-initiated data request, according to an exemplary embodiment.

Turning now to FIG. 5, aspects of a method 500 for selectively establishing an mRAB in response to a network-initiated data request will be described in detail. The method 500 begins and proceeds to operation 502, wherein the MD 102 establishes a voice session over a vRAB with the network 100. From operation 502, the method 500 proceeds to operation 504, wherein the mRAB decision application 130 collects uplink Tx power statistics during the voice session. From operation 504, the method proceeds to operation 506, wherein the MD 102 receives a network-initiated data request, such as a network-initiated data request described above with reference to FIG. 1. From operation 506, the method 500 proceeds to operation 508, wherein the mRAB decision application 130 calculates an available Tx power from the Tx power statistics collected during operation 504.

From operation 508, the method 500 proceeds to operation 510, wherein the mRAB decision application 130 determines if the available Tx power calculated in operation 508 is sufficient to support an mRAB. This determination may be based upon a thresholding algorithm, such as described above with reference to FIG. 2. If it is determined at operation 510 that the available Tx power is sufficient to support an mRAB, the method 500 proceeds to operation 512, wherein the network 100 initiates the establishment of an mRAB, for example, by generating (e.g., by the SGSN 126) a PDP context activation request and sending the PDP context activation request to the MD 102. The MD 102 and the SGSN 126 carry out the remainder of a PDP context activation procedure and an mRAB establishment procedure. After an mRAB is established, the voice session can be transferred to the mRAB and the vRAB can be torn down. From operation 512, the method 500 proceeds to operation 514, wherein the MD 102 executes a data operation associated with the network-initiated data request. From operation 514, the method proceeds to operation 516. The method 500 ends at operation 516.

If it is determined at operation 510 that the available Tx power is insufficient to support an mRAB, the method 500 proceeds to operation 518, wherein the mRAB decision application 130 denies the data request. In some embodiments, the MD 102, in response to the mRAB decision application 130 denying the data request, ignores the network-initiated data request, permitting the data request to be retried and, if the MD 102 again determines the available Tx power is insufficient, further ignore the retry attempt(s) and eventually time out. In these embodiments, the SGSN 126 may attempt to retransmit the data request to the MD 102. These attempts may also be ignored, or, after a certain number of retries, the MD 102 may respond with a notification that the MD 102 is unable to act on the data request. Denial of the data request may be accompanied by a notification to the user, as described in greater detail below with reference to FIG. 9. Alternatively, denial of the data request may be accompanied by an override option that is presented to the user, as described in greater detail below with reference to FIG. 10. From operation 518, the method 500 proceeds to operation 516. The method 500 ends at operation 516.

Figure 6:
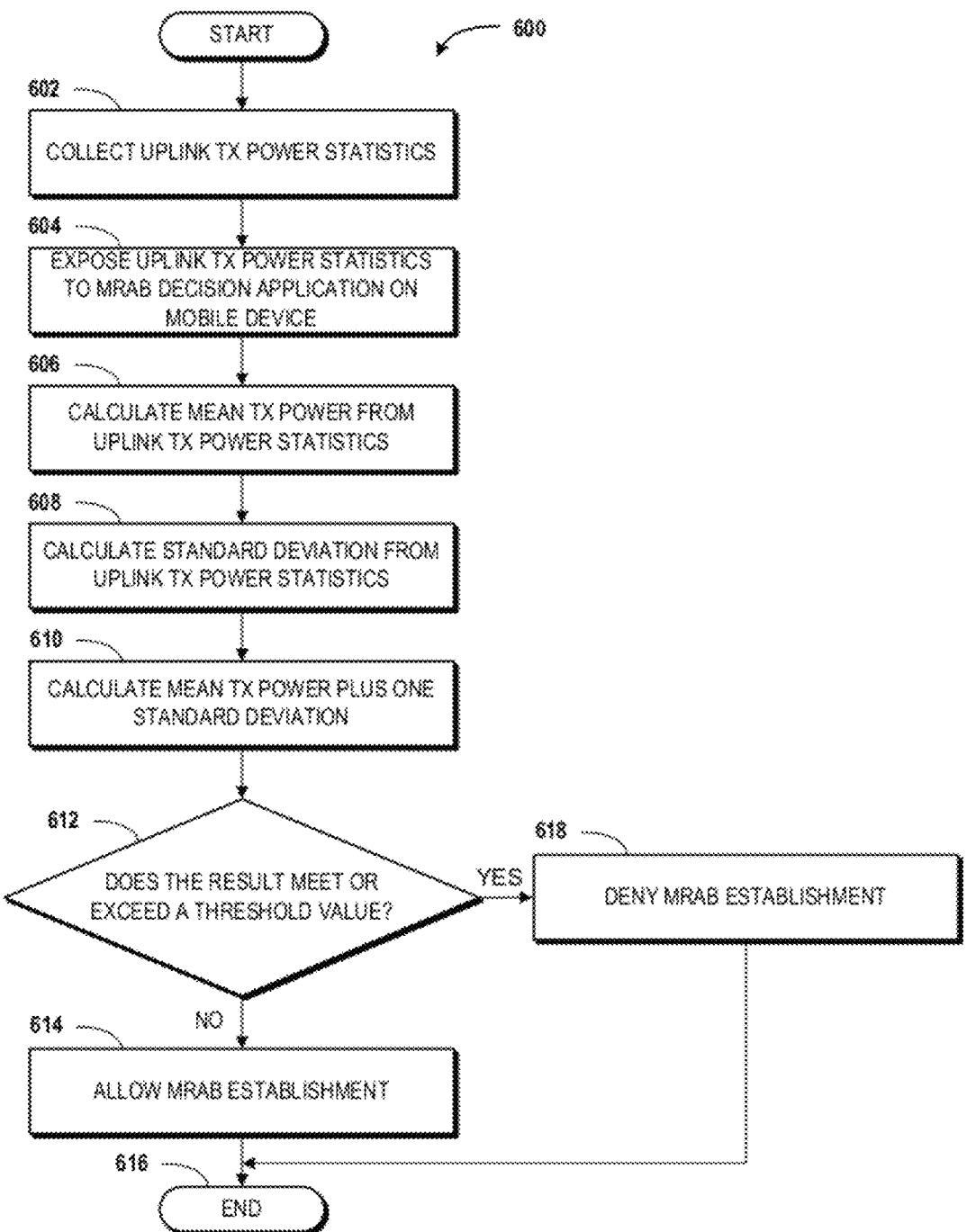
FIG. 6 is a flow diagram showing aspects of another method for selectively establishing an mRAB, according to an exemplary embodiment.

Turning now to FIG. 6, aspects of another method 600 for selectively establishing an mRAB will be described in detail. The method 600 begins and proceeds to operation 602, wherein the MD 102 collects uplink Tx power statistics, according to the methods described above. From operation 602, the method 600 proceeds to operation 604, wherein the MD 102 exposes the uplink Tx power statistics collected in operation 602 to the mRAB decision application 130. The Tx power statistics may be collected at any periodicity or intermittently, and for any duration. In some embodiments, the mRAB decision application 130 collects the uplink Tx power statistics and, as such, operation 604 is omitted. Otherwise, if another application (e.g., a measuring application) collects the uplink Tx power statistics, that application exposes the uplink Tx power statistics to the mRAB decision application 130 at operation 604.

From operation 604, the method proceeds to operation 606, wherein the mRAB decision application 130 calculates a mean (i.e., an average) Tx power from the uplink Tx power statistics. The mean Tx power may be calculated using any number of instantaneous uplink Tx power samples collected during operation 602. Moreover, the mean Tx power may be calculated using at least portion of the uplink Tx power samples collected during operation 602.

From operation 606, the method 600 proceeds to operation 608, wherein the mRAB decision application 130 calculates a standard deviation using the mean Tx power calculated in operation 606 and the uplink Tx power statistics. From operation 608, the method 600 proceeds to operation 610, wherein the mRAB decision application 130 calculates the mean Tx power plus one standard deviation.

From operation 610, the method 600 proceeds to operation 612, wherein it is determined if the result of operation 610 (i.e., the calculated mean Tx power plus one standard deviation) meets or exceeds a threshold value. For example, the threshold value may be set to a certain percentage of a maximum uplink Tx power of the MD 102. If the result does not meet or exceed the threshold value, there is sufficient uplink Tx power to support an mRAB. Accordingly, the method 600 proceeds from operation 612 to operation 614, wherein the mRAB decision application 130 allows establishment of an mRAB. From operation 614, the method 600 proceeds to operation 616. The method 600 ends at operation 616. If the result meets or exceeds the threshold value, the method 600 proceeds to operation 618, wherein the mRAB decision application 130 denies establishment of an mRAB. From operation 618, the method 600 proceeds to operation 616, wherein the method 600 ends.

It is contemplated that the threshold value can be generated using a learning model by which the MD 102 adjusts the threshold value depending upon various radio conditions that require more or less power. For example, the MD 102 may require less uplink Tx power to support an mRAB when the MD 102 is located in a rural or suburban environment than when the MD 102 is located in an urban environment due to the prevalence of buildings, traffic, and other obstacles that imped the propagation of radio signals in urban environments. Accordingly, the learning model may adjust the threshold value to require a lower percentage of the maximum uplink Tx power when in certain environments. This may be based at least partially upon location data received from a location component (shown in FIG. 16) of the MD 102 and/or historical power statistics collected over time that may or may not be correlated with location data. It is also contemplated that the threshold value can be generated using a weighting function that utilizes multiple statistics (e.g., uplink Tx power and downlink Rx power), each weighted by a certain factor to calculate a weighted result that is used to determine whether the MD 102 is capable of supporting an mRAB.

Turning now to FIG. 7, aspects of a method 700 for operating the SGSN 126 will be described in detail. The method 700 begins and proceeds to operation 702, wherein the SGSN 126 receives data directed to the MD 102 from the GGSN 128. From operation 702, the method 700 proceeds to operation 704, wherein the SGSN 126 sends a data request (e.g., in the form of a PDP context activation request, other message during a PDP context activation procedure, or a message associated with the establishment of a RAB) to the RNC 118.

From operation 704, the method 700 proceeds to operation 706, wherein the SGSN 126 receives instructions from the RNC 118 to delay delivery of data associated with the data request to the MD 102. In some embodiments, the instructions received from the RNC 118 are based upon a notification received by the RNC 118 from the MD 102 indicating that sufficient uplink Tx power is currently not available to establish an mRAB. The notification may be implicit such as by one or more previous attempts to contact the MD 102 to establish a data connection being ignored, or explicit such as by a message received at the RNC 118 from the MD 102. In some embodiments, the RNC 118 determines that the MD 102 is currently not available to establish an mRAB. This may be determined, for example, using a downlink Tx power of the node B 116 to the MD 102 for a current voice call as an estimate of the uplink Tx power of the MD 102.

From operation 706, the method 700 proceeds to operation 708, wherein the SGSN 126 checks the data type of the data received from the GGSN 128. In some embodiments, the SGSN application 134 (shown in FIG. 1) stores a retry interval and a number of retry attempts for various data types. In some embodiments, the retry intervals and/or the number of retry attempts are set by a mobile network operator, an operator of the SGSN 126, a user of the MD 102, or another party. In some embodiments, the retry intervals and/or the number of retry attempts are set according to a priority scheme, wherein certain data types have a higher priority than others. In this manner, a mobile network operator, for example, can prioritize which type(s) of data is sent to a target device when the target device is engaged in a voice call.

From operation 708, the method 700 proceeds to operation 710, wherein the SGSN 126 determines a retry interval based upon the data type determined in operation 708. Operation 710 may be a look-up operation, wherein the SGSN application 134 looks up the retry interval and/or the number of retry attempts associated with the determined data type in a table stored in the SGSN 126. From operation 710, the method 700 proceeds to operation 712, wherein the SGSN 126 retries transmission of the data request to the RNC 118 based upon the retry interval determined in operation 710. The retry interval can be any interval.

From operation 712, the method 700 proceeds to operation 714, wherein it is determined if a retry attempt was successful. If a retry attempt was successful, the method 700 proceeds from operation 714 to operation 716, wherein the SGSN 126 sends the data to the RNC 118 for delivery to the MD 102 via the node B 116. From operation 716, the method 700 proceeds to operation 718. The method 700 ends at operation 718. If a retry attempt was not successful, the method 700 proceeds to operation 720, wherein it is determined if the number of retry attempts has been exhausted. If the number of retry attempts has not been exhausted, the method 700 proceeds to operation 712, wherein the SGSN 126 again retries transmission of the data based upon the retry interval. If the number of retry attempts has been exhausted, however, the method 700 proceeds to operation 722, wherein the SGSN 126 notifies the GGSN 128 of the failed retry attempts. The GGSN may then notify the server 114 or other data source that the data cannot be transmitted to the MD 102. From operation 722, the method 700 proceeds to operation 718, wherein the method 700 ends.

Turning now to FIG. 8, aspects of a method 800 for operating the RNC 118 will be described in detail. The method 800 begins and proceeds to operation 802, wherein the RNC 118 receives a data request from the SGSN 126. From operation 802, the method 800 proceeds to operation 804, wherein the RNC 118 determines that the available uplink Tx power of the MD 102 is insufficient to support an mRAB. In some embodiments, this determination is made based upon information received from the MD 102. The information may be implicit such as by one or more previous attempts to contact the MD 102 to establish a data connection being ignored, or explicit such as by a message received from the MD 102 in response to a previous attempt (e.g., a denied PDP context activation request). It should be understood that the previous attempts may be associated with the data request received in operation 802 or another data request received within a predetermined time period of the RNC 118 receiving the data request.

From operation 804, the method 800 proceeds to operation 806, wherein the RNC 118 holds the data request and prompts the SGSN 126 to buffer data associated with the data request. From operation 806, the method 800 proceeds to operation 808, wherein the RNC 118 retries transmission of the data request to the MD 102 based upon a retry interval. The retry interval can be set in the RNC application 132 at any interval. For example, if the average voice call experienced by the RNC 118 is known to be between 100 and 120 seconds, the RNC application 132 can be set with a retry interval of 120 seconds which would, on average, be successful on a second retry attempt. The retry interval may be set by a mobile network operator, an operator of the RNC 118, a user of the MD 102, or another party.

From operation 808, the method 800 proceeds to operation 810, wherein it is determined if a retry attempt was successful. If a retry attempt was successful, the method 800 proceeds from operation 810 to operation 812, wherein the RNC 118 requests and receives the buffered data from the SGSN 126. From operation 812, the method 800 proceeds to operation 814, wherein the RNC 118 sends the data to the MD 102 via the node B 116. From operation 814, the method 800 proceeds to operation 816. The method 800 ends at operation 816. If a retry attempt was not successful, the method 800 proceeds to operation 818, wherein it is determined if a number of retry attempts has been exhausted. If the number of retry attempts has not been exhausted, the method 800 proceeds to operation 808, wherein the RNC 118 again retries transmission of the data request based upon the retry interval. If the number of retry attempts has been exhausted, however, the method 800 proceeds to operation 820, wherein the RNC 118 notifies the SGSN 126 of the failed retry attempts. The SGSN 126 may then notify the GGSN 128 that the data cannot be transmitted to the MD 102. The GGSN 128 may, in turn, notify the server 114 or other data source of the same. From operation 820, the method 800 proceeds to operation 816, wherein the method 800 ends.

Figure 9:
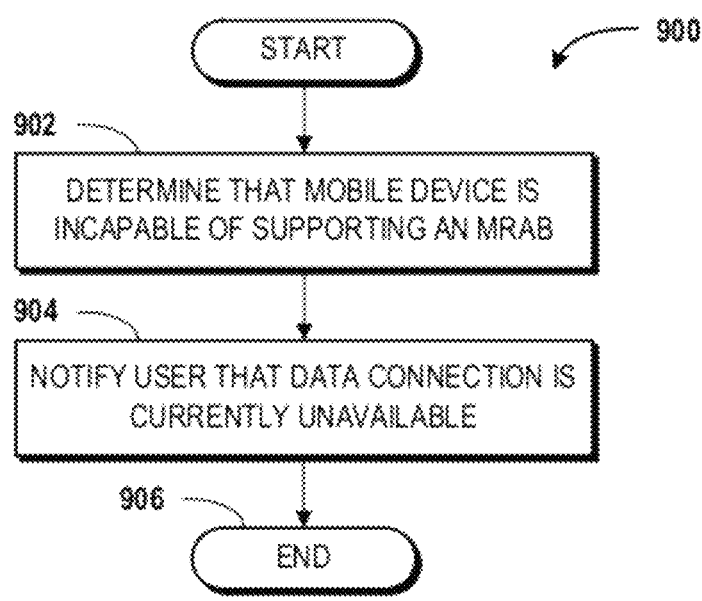
FIG. 9 is a flow diagram showing aspects of a method for notifying a user that a data connection is currently unavailable, according to an exemplary embodiment.

Turning now to FIG. 9, aspects of a method 900 for notifying a user that a data connection is currently unavailable will be described in detail. The method 900 begins and proceeds to operation 902, wherein it is determined that the MD 102 is incapable of supporting an mRAB. This determination may be made based upon any of the applicable methods disclosed herein above.

From operation 902, the method 900 proceeds to operation 904, wherein the MD 102 notifies the user that a data connection is currently unavailable. In some embodiments, the MD 102 notifies the user using visible, audible, and/or tactile notification mechanisms. In particular, the MD 102 may use text, graphics, videos, sounds, music, vibrations, or combinations thereof to notify the user that a data connection is currently unavailable. It is contemplated that the mechanism by which such notifications are presented to the user be configurable by the user, a mobile network operator, a third party (e.g., a device manufacturer or device software developer/distributor), or some combination thereof. Moreover, the notification can be triggered at the operating system or application level. In some embodiments, an operating system or an application receives a trigger to present the notification via the mRAB decision application 130. From operation 904, the method 900 proceeds to operation 906. The method 900 ends at operation 906.

Figure 10:
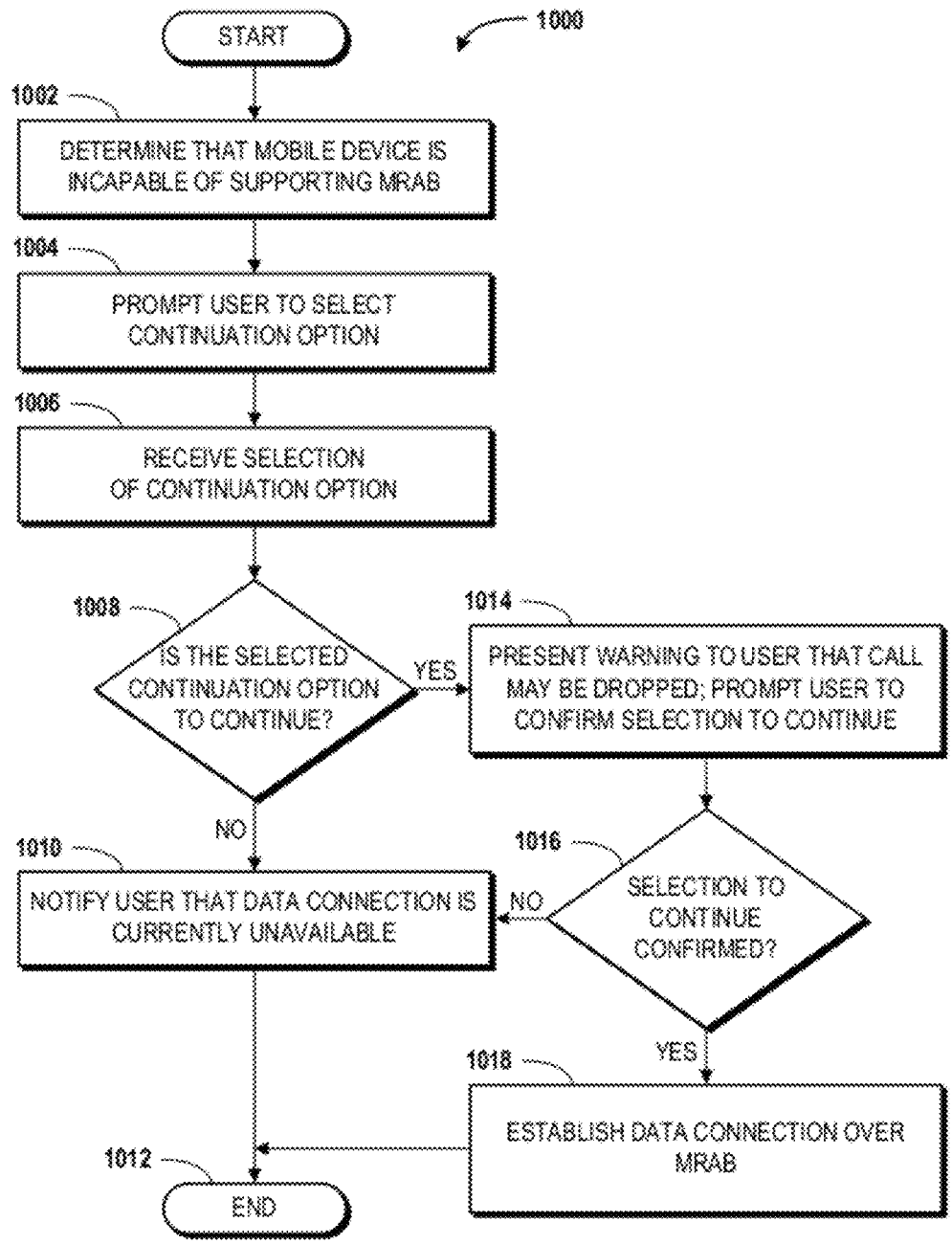
FIG. 10 is a flow diagram showing aspects of a method for providing a user override option if the establishment of an mRAB is denied, according to an exemplary embodiment.

Turning now to FIG. 10, aspects of a method 1000 for providing a user override option will be described in detail. The method 1000 begins and proceeds to operation 1002, wherein it is determined that the MD 102 is incapable of supporting an mRAB. From operation 1002, the method 1000 proceeds to operation 1004, wherein the MD 102 prompts the user to select a continuation option. In the illustrated embodiment, continuation options include an option to continue with a data connection and an option not to continue with a data connection. In other embodiments, the continuation options include selectable options for various uplink and/or downlink data rates, one or more of which may have different power requirements to support. In these embodiments, the mRAB decision application 130 may be configured to suggest a data rate based upon the available uplink Tx power of the MD 102. In some embodiments, a default option (e.g., continue, do not continue, or select a slower data rate that requires less power) is set.

From operation 1004, the method 1000 proceeds to operation 1006, wherein the MD 102 receives a selection of a continuation option. From operation 1006, the method 1000 proceeds to operation 1008, wherein it is determined if the selected continuation option is to continue with the establishment of an mRAB. If the selected continuation option is not to continue, the method 1000 proceeds from operation 1008 to operation 1010, wherein the MD 102 notifies the user that a data connection is currently unavailable. The notification used in operation 1010 may be similar to the notification described above with reference to FIG. 9. From operation 1010, the method 1000 proceeds to operation 1012. The method 1000 ends at operation 1012.

If the selected continuation option is to continue, the method 1000 proceeds from operation 1008 to operation 1014, wherein the MD 102 presents a warning to the user indicating that their call may be dropped should they choose to continue with a data connection. In the illustrated embodiment, at operation 1014, the MD 102 also prompts the user to confirm their selection to continue after presentation of the warning. From operation 1014, the method 1000 proceeds to operation 1016, wherein it is determined if the user has confirmed their selection to continue. If the user does not confirm their selection to continue, the method 1000 proceeds from operation 1016 to operation 1010, wherein the MD 102 notifies the user that a data connection is currently unavailable. From operation 1010, the method 1000 proceeds to operation 1012, wherein the method 1000 ends. If, at operation 1016, the user confirms their selection to continue, the method 1000 proceeds from operation 1016 to operation 1018, wherein a data connection is established over an mRAB. Alternatively, the warning presented in operation 1014 may be presented without prompting the user for confirmation and the method 1000 proceeds automatically from operation 1014 to operation 1018. In any case, from operation 1018, the method 1000 proceeds to operation 1012, wherein the method 1000 ends.

Figure 11:
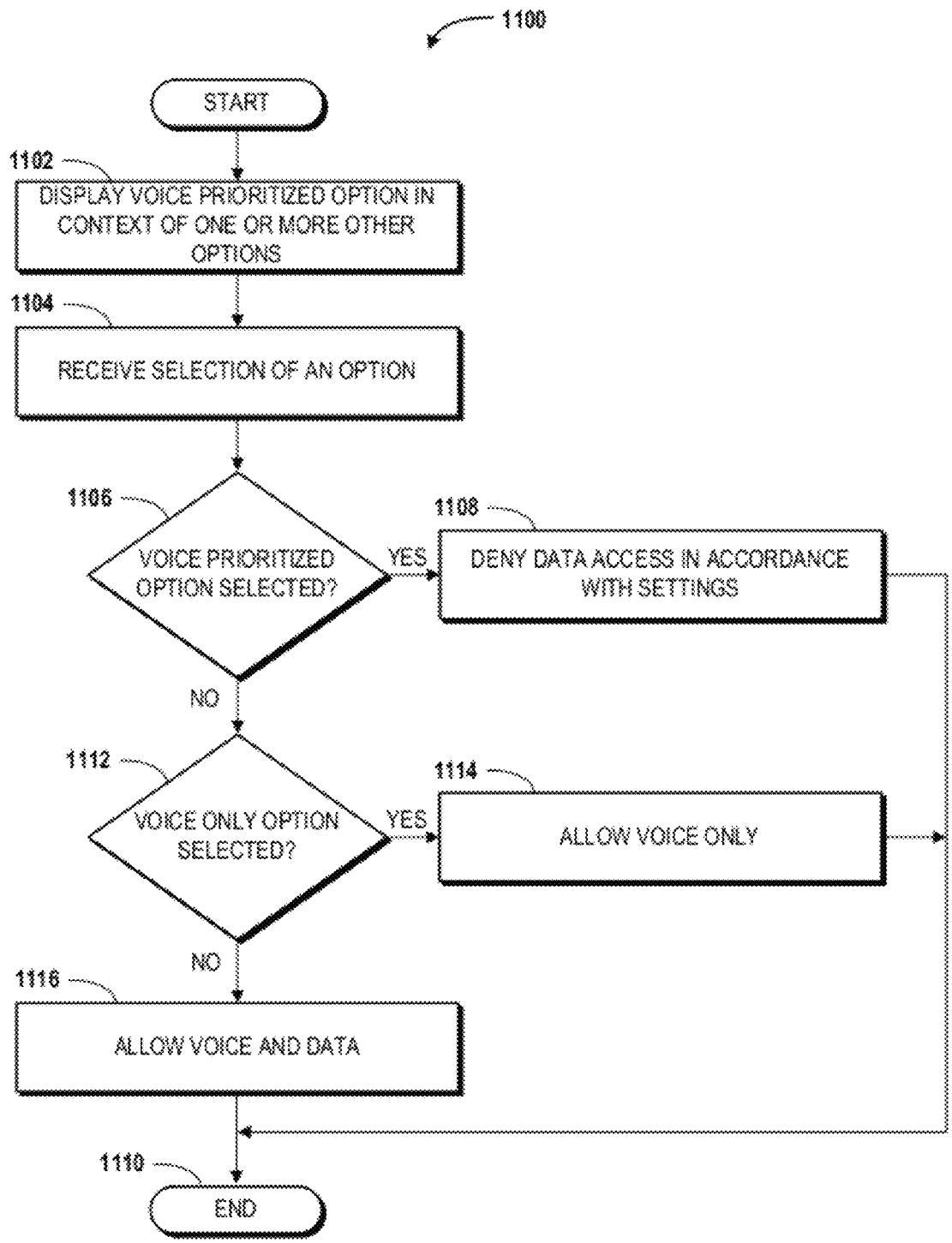
FIG. 11 is a flow diagram showing aspects of a method for prioritizing voice calls over data based upon a selection of a voice priority option, according to an exemplary embodiment.

Turning now to FIG. 11, aspects of a method 1100 for prioritizing voice calls over data communications based upon a selection of a voice priority option will be described. The method 1100 begins and proceeds to operation 1102, wherein a voice prioritized option is displayed. In some embodiments, the voice prioritized option is displayed as a single selectable option. For example, the voice prioritized option may be displayed along with a check box, a radio button, or some other GUI element, the selection/de-selection of which visually distinguishes between a selected state and a non-selected state of the voice prioritized option. In the illustrated embodiment, the voice prioritized option is displayed in context of one or more other options, such as a voice only (i.e., no data) option and/or a voice and data (i.e., normal operation) option.

In some embodiments, the voice prioritized option is displayed prior to a voice call being established, during establishment of a voice call, during a voice call, and/or after a voice call. In some embodiments, the voice priority option is provided as part of the MD application 130, as part of a dialer application of the MD 102, as part of an operating system (best shown in FIG. 16) of the MD 102, and/or as part of a software widget. Exemplary GUIs including a voice priority option are described below with reference to FIGS. 12A-12C.

From operation 1102, the method 1100 proceeds to operation 1104, wherein a selection of one of the options is received. It should be understood that the selection of one of the options may be effected through an input interface of the MD 102, such as the input interface described below with reference to FIG. 16. Other input methods such as voice recognition or remote control are contemplated.

At operation 1106, it is determined if the voice prioritized option has been selected. If the voice prioritized option has been selected, the method 1100 proceeds to operation 1108, wherein data access is conditionally denied in accordance with settings established for the voice prioritized option. In some embodiments, the selection of the voice prioritized option enables the MD 102 to perform one of the other methods, such as the methods described herein above with reference to FIGS. 2-6. In some embodiments, data access is denied when a poor radio frequency condition is experienced by the MD 102. In some embodiments, data access is denied when a poor RF condition is experienced by the MD 102, unless a user initiates a data session. In some embodiments, data access is permitted only for a specified one or more applications.

A poor RF condition may exist if the uplink Tx power of the MD 102 exceeds a particular threshold such as a maximum uplink Tx power, as described in greater detail above. A poor RF condition may be determined to exist based at least in part upon a received signal code power ("RSCP"), a ratio of the received energy and the interference level (i.e., Ec/Io), a carrier-to-noise ratio (i.e., Ec/N0), and/or the received signal strength indicator ("RSSI"). The threshold values for what constitutes a poor RF condition may be determined by the service provider or another entity, such as the user of the MD 102 or a remote entity. A poor RF condition may be determined to exist based at least in part upon other metrics.

From operation 1108, the method 1100 proceeds to operation 1110. The method 1100 ends at operation 1110.

If, at operation 1106, it is determined that the voice prioritized option has not been selected, the method 1100 proceeds to operation 1112. At operation 1112, it is determined if a voice only option has been selected. If a voice only option has been selected, the method 1100 proceeds to operation 1114, wherein only voice calls are allowed (i.e., no data is allowed under any condition). The method 1100 then proceeds to operation 1110, wherein the method 1100 ends.

If, at operation 1112, it is determined that the voice only option has not been selected, the method 1100 proceeds to operation 1116, wherein voice and data is allowed. In other words, the MD 102 is allowed to perform operations that require voice and/or data access in accordance with normal operations. The method 1100 then proceeds to operation 1110, wherein the method 1100 ends.

Figure 12A:
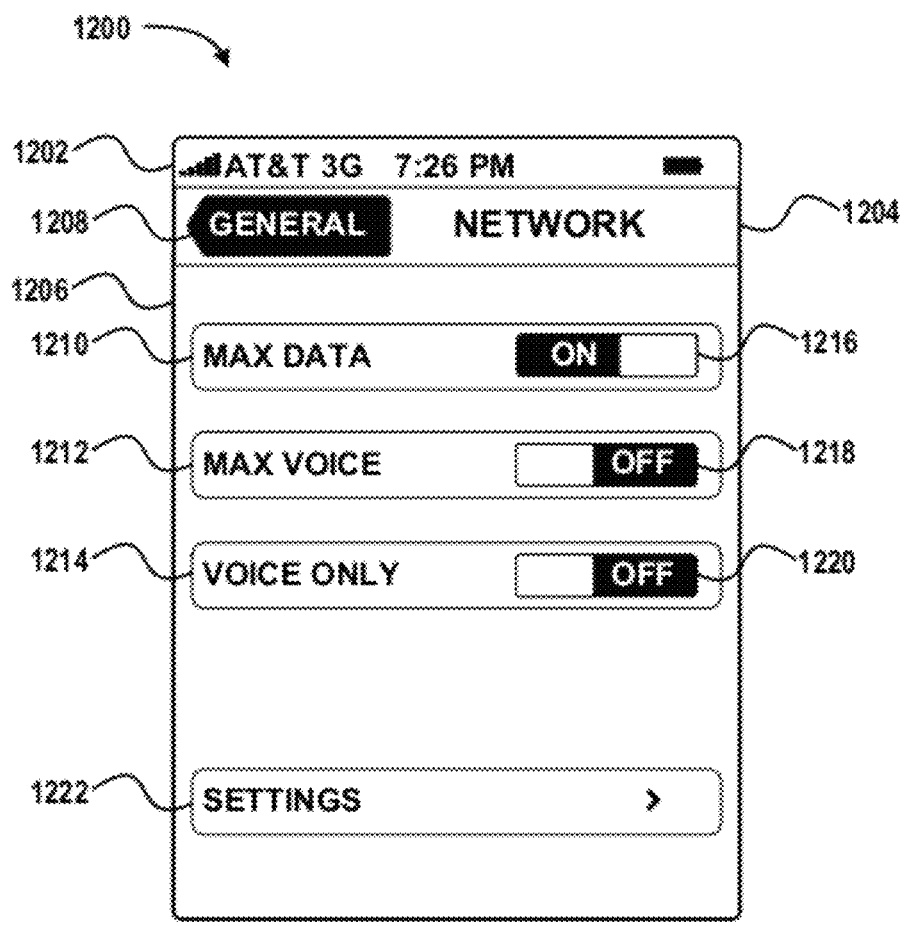
FIGS. 12A-12C are graphical user interfaces ("GUIs") illustrating a means for selecting a voice priority option, according to various exemplary embodiments.
Figure 12B:
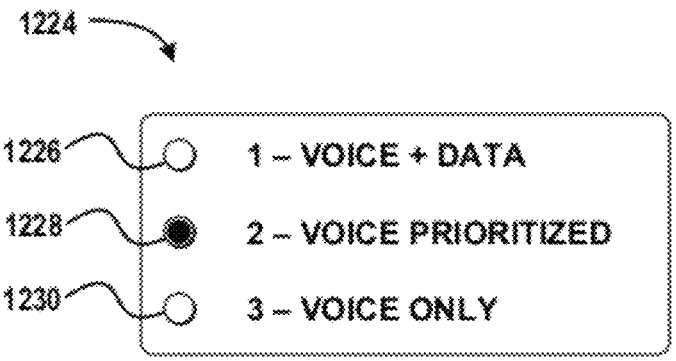
Figure 12C:
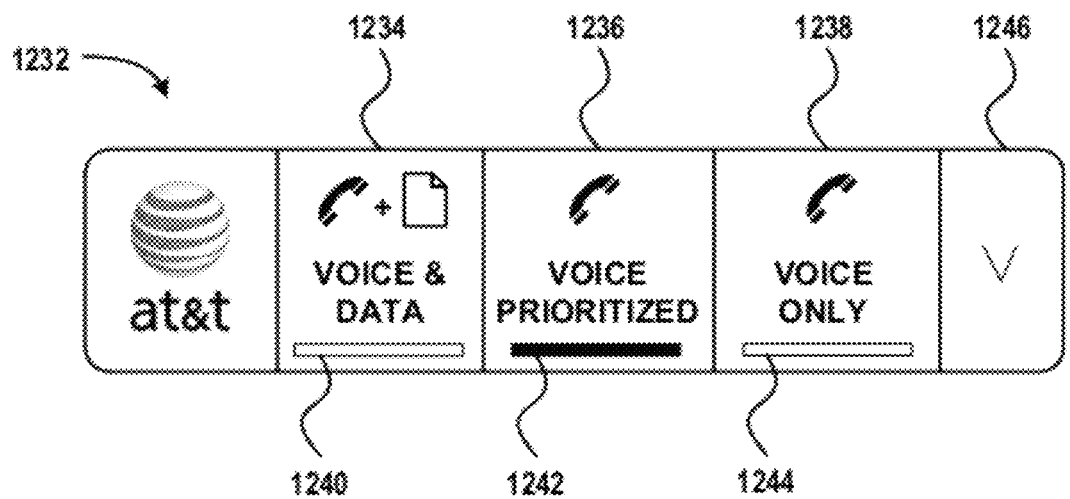

Turning now to FIGS. 12A-12C, various exemplary GUIs illustrating various means by which a voice priority option can be selected will be described. With particular reference to FIG. 12A, a network overview GUI 1200 is illustrated. The network overview GUI 1200 includes a status bar 1202, a navigation bar 1204, and a main body 1206.

The illustrated status bar 1202 includes a signal strength indicator, a carrier/service provider identifier (e.g., "AT&T"), a service type identifier (e.g., "3G"), a time, and a battery level indicator. Alternative and/or additional indicators and/or identifiers are contemplated. For example, certain operations executed by the MD 102 may cause a particular icon or other visual representation to be presented in the status bar 1202 to indicate a status of the operation, such as active, not active, or the like. In some embodiments, an icon or other visual representation (not shown) representing a selection of a voice prioritized option, a voice only option, or a voice and data is displayed in the status bar 1202.

The illustrated navigation bar 1204 includes a previous button 1208 that is used to navigate to a previous screen which, in the illustrated embodiment, is a "general" screen. The navigation bar 1204 also includes a title (not labeled) of "Network" identifying that settings presented in the main body 1206 are relevant to network details. Alternative and/or additional buttons may be displayed in the navigation bar 1204.

The illustrated main body 1206 includes a maximum data coverage selector 1210, a maximum voice coverage selector 1212, and voice only selector 1214, each of which is associated with a toggle button 1216, 1218, 1220, respectively. The toggle buttons 1216, 1218, 1220 allow a user to toggle the features provided by the selectors 1210, 1212, 1214. In particular, toggling the toggle button 1216 of the maximum data coverage selector 1210 to "ON", as in the illustrated embodiment, allows simultaneous voice and data communications in accordance with normal operation; toggling the toggle button 1218 of the maximum voice coverage selector 1212 to "ON" prioritizes voice over data; and toggling the toggle button 1220 to "ON" activates a voice only such that data is never allowed. It is contemplated that not all of the selectors 1210, 1212, 1214 may be presented. For example, the maximum voice coverage selector 1212 may be the only option available such that the user may prioritize voice or not. Moreover, alternative labeling is contemplated as is needed to best convey the outcome of activating a particular selector.

In some embodiments, selection of the maximum voice coverage selector 1212 causes the automatic shutdown of data access when certain RF conditions are experienced by the MD 102. For example, if the MD 102 experiences an established low RSSI or an established high Ec/N0, data access may be shutdown. To summarize without limitation, the MD application 130 may turn off data access during voice calls and per RF thresholds when the maximum voice coverage selector 1212 is selected. Moreover, the MD application 130 may turn on data access when the maximum voice selector 1212 is selected and if the MD 102 experiences RF conditions that pass established thresholds. In some embodiments, the threshold is passed in addition to a certain hysteresis.

The illustrated main body 1206 also includes a settings menu option 1222. Selection of the settings menu option 1222 navigates to a network settings GUI 1300 that is illustrated and described below with reference to FIG. 13.

The options for voice and data, voice prioritized, and/or voice only may be provided in alternative forms, such as via a software widget. Two exemplary software widgets are illustrated in FIGS. 12B and 12C. In particular, FIG. 12B illustrates a simple software widget 1224 including radio buttons 1226, 1228, 1230, the selection of which activates, respectively, a voice and data option, a voice prioritized option, or a voice only option. The simple software widget 1224 may be displayed, for example, on a home screen of a mobile device running an operating system that supports software widgets (e.g., ANDROID OS from GOOGLE INC.) or, alternatively, a software application that enables support for software widgets for an operating system that does not natively support software widgets.

FIG. 12C illustrates an advanced software widget 1232 including a voice and data button 1234, a voice prioritized button 1236, and a voice only button 1238. Each of the buttons 1234, 1236, 1238 is associated with an indicator bar 1240, 1242, 1244, respectively. Selection of one of the buttons 1234, 1236, 1238 causes modification of the corresponding indicator bar 1240, 1242, 1244 to convey the selection. For example, the selected indicator bar (the indicator bar 1242 in the illustrated embodiment) may change color, change brightness, change contrast, change from a static state to an animated state, or otherwise be visually modified so as to appear different to user from a non-selected appearance. The advanced software widget 1232 also includes an extras button 1246, the selection of which may provide a user access to additional information such as settings.

It should be understood that the GUIs 1200, 1224, 1232 may not include all of the elements shown in FIGS. 12A-12C, may include other elements that are not explicitly shown in FIG. 12A-12C, or may utilize one or more elements that are completely different than those shown in FIGS. 12A-12C. It also should be understood that the design of the GUIs may be consistent with a GUI theme of a particular operating system or application, may be an existing proprietary GUI design, or may be a new GUI design. Moreover, the features provided by the GUIs 1200, 1224, 1232 may be implemented in other applications, such as in a dialer application.

Figure 13:
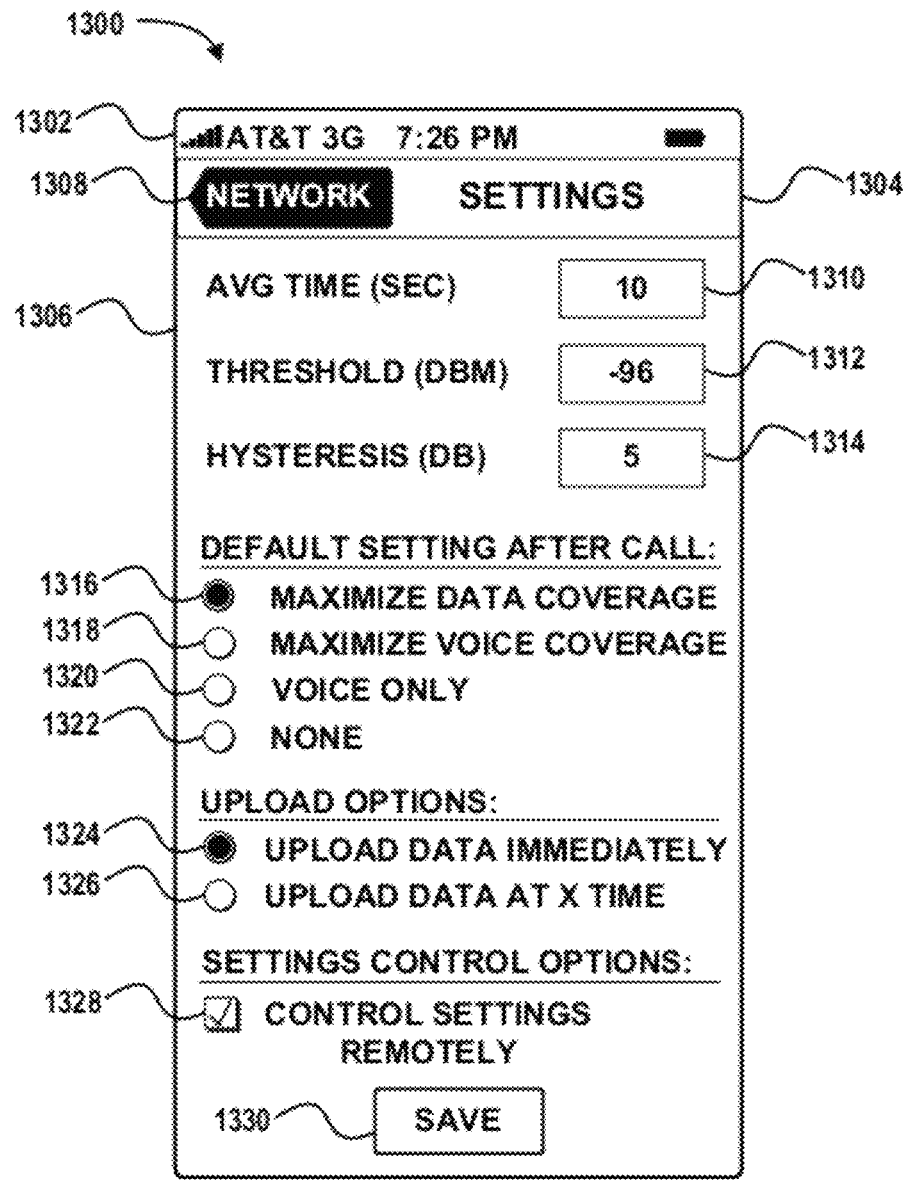
FIG. 13 is a GUI illustrating voice priority settings, according to an exemplary embodiment.

Turning now to FIG. 13, a network settings GUI 1300 illustrating voice priority settings will be described. The illustrated network settings GUI 1300 includes a status bar 1302, a navigation bar 1304, and a main body 1306. It should be understood that access to the following settings may be protected by a password and/or some other authentication mechanism such that only authorized individuals can access the settings.

The illustrated status bar 1302 includes a signal strength indicator, a carrier/service provider identifier (e.g., "AT&T"), a service type identifier (e.g., "3G"), a time, and a battery level indicator. Alternative and/or additional indicator and/or identifier are contemplated. For example, certain operations executed by the MD 102 may cause a particular icon or other visual representation to be presented in the status bar 1302 to indicate a status of the operation, such as active, not active, or the like. In some embodiments, an icon or other visual representation (not shown) representing a selection of a voice prioritized option, a voice only option, or a voice and data is displayed in the status bar 1302.

The illustrated navigation bar 1304 includes a previous button 1308 that is used to navigate to a previous screen which, in the illustrated embodiment, is a network screen, such as the network overview GUI 1200 illustrated in FIG. 12A. The navigation bar 1304 also includes a title (not labeled) of "Settings". Alternative and/or additional buttons may be displayed in the navigation bar 1304.

The upper portion of the illustrated main body 1306 includes an average time input box 1310, a threshold input box 1312, and a hysteresis input box 1314. In some embodiments, one or more of the input boxes 1310, 1312, 1314 are populated with values at the discretion of a user, such as a tester. In some embodiments, one or more of the input boxes 1310, 1312, 1314 are populated remotely. For example, a server, such as one of the servers 114, may be configured to send values to the MD 102 for input into an appropriate one or more of the input boxes 1310, 1312, 1314, such as described in greater detail below with reference to FIG. 14. Alternative and/or additional input boxes are contemplated including, but not limited to, an input box for Ec/Io.

The illustrated average time input box 1310 includes an average time value of "10" in seconds. This identifies the average time in seconds of a measurement sample or time between measurement samples. The average time may be more or less based upon the needs of a particular implementation. Moreover, the average time may be valued in terms of a different time metric, such as, but not limited to, milliseconds or minutes.

The illustrated threshold input box 1312 includes a threshold power value of "−96" in dBm. In some embodiments, this threshold value is the same as the threshold value utilized in the method 600 illustrated and described above with reference to FIG. 6 and as described elsewhere herein. The threshold power value may be more or less based upon the needs of a particular implementation. Although the threshold power value is expressed in terms of dBm, other units are contemplated.

The illustrated hysteresis input box 1314 includes a hysteresis value of "5" in dB. In some embodiments, the hysteresis value is used to determine when to turn data back on. The hysteresis value may be more or less based upon the needs of a particular implementation. Although the hysteresis value is expressed in terms of dB, other units are contemplated.

The lower portion of the illustrated main body 1306 includes a default setting after a call. The illustrated default setting options include a maximize data coverage option 1316, a maximize voice coverage option 1318, a voice only option 1320, and a none option 1322, each of which is associated with a radio button for selection. These options are consistent with the same options described above with reference to FIG. 12A, but are designated as default options after a call.

The lower portion of the illustrated main body 1306 also includes upload options. The illustrated upload options include an upload data immediately option 1324 and an upload data at X time option. The upload data immediately option 1324, when selected via the illustrated radio button, uploads any measurement data immediately when it is available. Alternatively, when the upload data at X time option is selected, measurement data is sent at X time. For example, a service provider may desire to configure this setting such that measurement data is sent at midnight or at some other time chosen to minimize impact, such as at a historically low-data-use time. It is contemplated that the X time may alternatively represent a time range.

The illustrated main body 1306 also includes a control settings remotely option 1328 and a save button 1330. In the illustrated embodiment, a check box associated with the control settings remotely option 1328 is checked, indicating that the settings described above are controlled by a remote entity, such as one of the servers 114. In some embodiments, the aforementioned settings are grayed-out, blacked-out, non-functional, non-viewable, or otherwise not editable by a user if the control settings remotely option 1328 is checked. In some embodiments, a user may override the control settings remotely option 1328.

Figure 14:
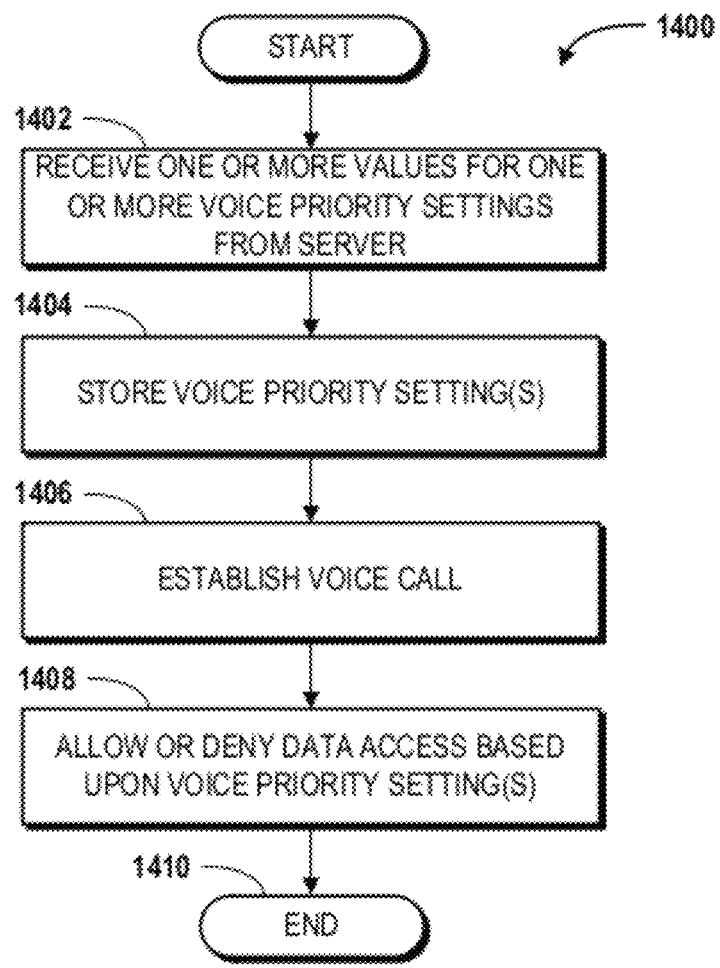
FIG. 14 is a flow diagram showing aspects of a method for remotely configuring voice priority settings, according to an exemplary embodiment.

Turning now to FIG. 14, aspects of a method 1400 for remotely configuring voice priority settings will be described. The method 1400 begins and proceeds to operation 1402, wherein one or more values for one or more voice priority settings are received at the MD 102 from a server, such as one of the servers 114. From operation 1402, the method 1400 proceeds to operation 1404, wherein the voice priority value(s) are stored.

In some embodiments, the values are saved in one or more of the input boxes 1310, 1312, 1314 (shown in FIG. 13) and/or one or more other input boxes (not shown). For example, the MD 102 may receive a value for an average time, a power threshold, a hysteresis, an Ec/Io, and/or other settings or statistics described herein. In some embodiments, the one or more values for the one or more voice priority settings received from the server toggle the maximum data coverage, the maximum voice coverage, or the voice only options, or other options described herein. In this manner, a service provider can remotely control which mobile devices operating on their network are able to receive data. This can be used, for example, for testing (e.g., the mobile devices are being used by testers) and/or for data usage throttling to prevent certain users from excess usage of data service for the benefit of the user (e.g., to prevent data overage charges) and/or the service provider (e.g., to prevent abuse of unlimited data plans).

From operation 1404, the method 1400 proceeds to operation 1406, wherein a voice call is established. The method 1400 then proceeds to operation 1408, wherein data access is allowed or denied based upon the voice priority setting(s). This may be consistent, for example, with the other methods described herein. From operation 1408, the method 1400 proceeds to operation 1410, wherein the method 1400 ends.

Figure 15:
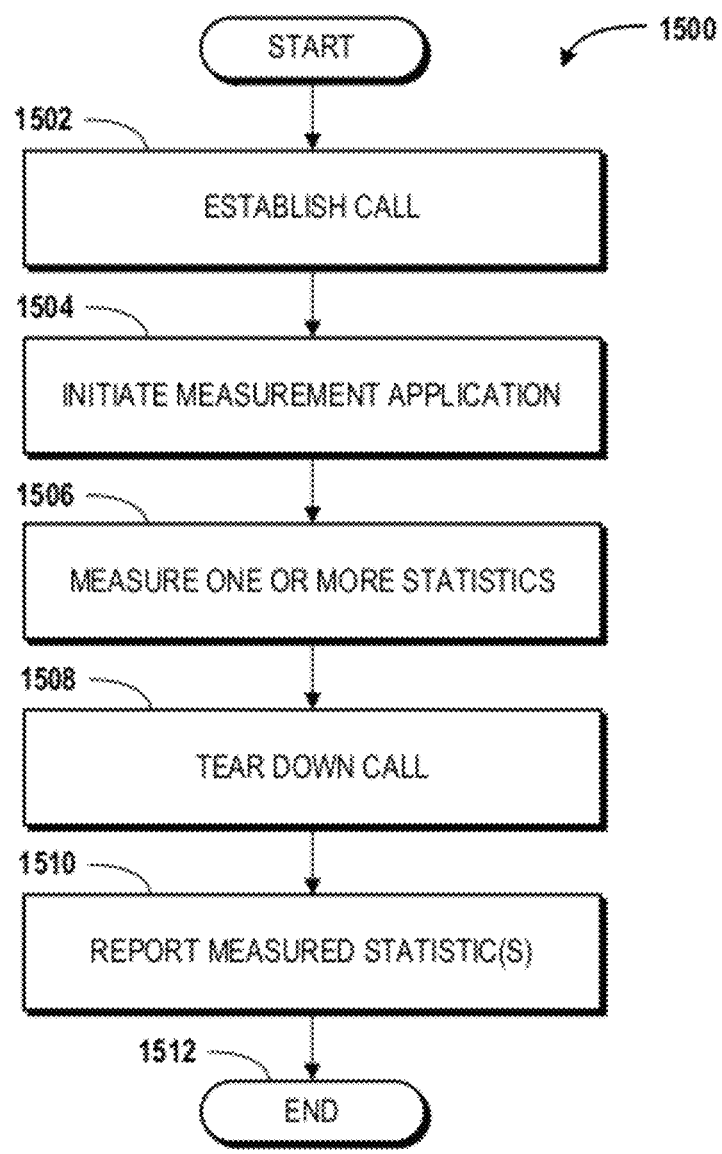
FIG. 15 is a flow diagram showing aspects of a method for reporting measured statistics to a remote server, according to an exemplary embodiment.

Turning now to FIG. 15, aspects of a method 1500 for reporting measured statistics to a remote server, such as one of the servers 114, will be described. In some embodiments, the remote server is the same as the server described above in FIG. 14.

The method 1500 begins and proceeds to operation 1502, wherein a voice call is established. From operation 1502, the method 1500 proceeds to operation 1504, wherein the MD 102 initiates a measurement application. In some embodiments, operation 1502 and operation 1504 are performed simultaneously. In some embodiments, operation 1502 and operation 1504 are performed sequentially. The measurement application may also be initiated prior to a voice call being established. For example, the measurement application may be running in the background and "wake-up" upon a voice call being initiated such that various measurements can be obtained. The measurement application may be configured as described above.

From operation 1504, the method 1500 proceeds to operation 1506, wherein the measurement application measures one or more statistics. Table 1, illustrated below, includes various exemplary statistics the measuring application can collect in accordance with the method 1500. For example, some of the statistics are measured during the call while others are measured after the call. It should be understood that other statistics may be added as needed for a particular implementation.

From operation 1506, the method proceeds to operation 1508, wherein the call is torn down. From operation 1508, the method proceeds to operation 1510, wherein the measured statistics are reported. As noted above, some of the statistics may be measured after the call and, as such, a second measurement operation may be performed after the call is torn down at operation 1508. In the illustrated embodiment, the measured statistics are reported to the server after the call is torn down. Alternatively or additionally, one or more of the measured statistics may be reported during the call. The method 1500 ends at operation 1512.

TABLE 1

Exemplary statistics for measurement.
Statistic

Figure 16:
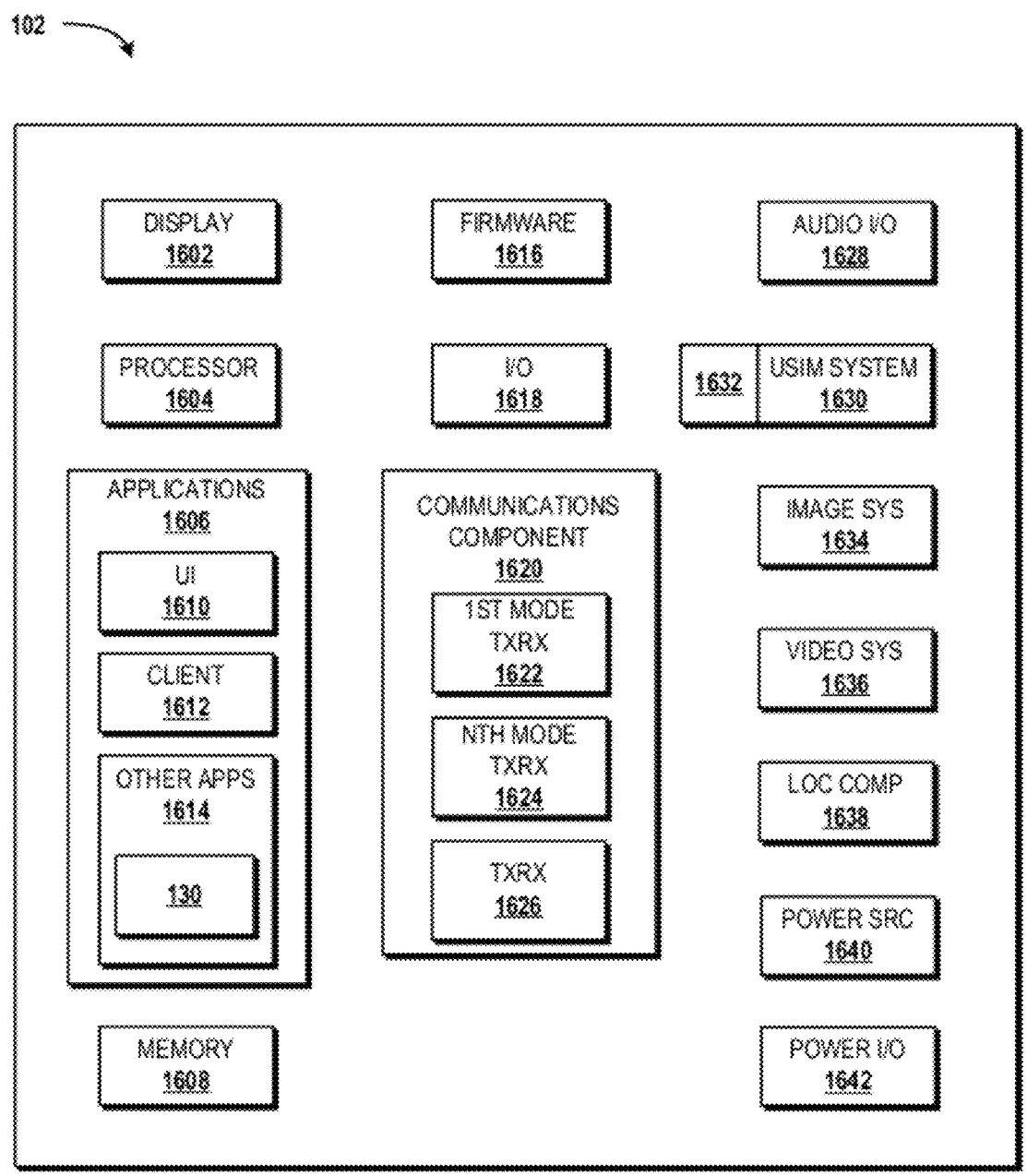
FIG. 16 is a mobile device architecture diagram illustrating an exemplary device hardware and software architecture for a mobile device capable of implementing aspects of the embodiments presented herein.

Record ID for measurement session
Phone number for mobile device
Time stamp for measurement session
Counter in seconds user in setting 1 (e.g., maximum data coverage)
Counter in seconds user in setting 2 (e.g., maximum voice coverage)
Counter in seconds user in setting 1 (e.g., voice only)
Counter in seconds user having data session in setting 1
Counter in seconds user having data session in setting 2
Average RSSI for setting 1
Average RSSI for setting 2 when data is enabled
Average RSSI for setting 2 when data is disabled
Average RSSI for setting 3
Call termination status (e.g., user-terminated or dropped call)
Latitude of mobile device at end of call
Longitude of mobile device at end of call
List of all open applications
List of all applications on mobile device that generated data during call
Last application setting when call hang up occurred and before application reset back to voice prioritized
Battery level at beginning of the call
Battery level at end of the call
Last RSSI
Data usage during setting 1
Data usage during setting 2
Network type at end of the call
WIFI used during the call?
Cell ID at end of the call
Application version number
WIFI active at end of call
Mobile device make and model Turning now to FIG. 16, an exemplary mobile communications device, such as the MD 102, and the components thereof is illustrated, according to an exemplary embodiment. Although connections are not shown between the components illustrated in FIG. 16, the components can interact with each other to carry out device functions. In some embodiments, for example, the components are arranged so as to communicate via one or more busses (not shown). It should be understood that FIG. 16 and the following description are intended to provide a general understanding of a suitable environment in which various aspects of embodiments can be implemented.

As illustrated in FIG. 16, the MD 102 includes a display 1602 for displaying data including, but not limited to, graphical user interface ("GUI") elements, text, images, video, virtual keypads and/or keyboards, messaging data, notification messages, metadata, internet content, device status, time, date, calendar data, device preferences, map and location data, profile selection (e.g., loud or silent mode), and the like. The MD 1602 also includes a processor 1604 for processing data and/or executing computer-executable instructions of one or more applications 1606 stored in a memory 1608. In some embodiments, the applications 1606 include a user interface ("UI") application 1610. The UI application 1610 interfaces with a client application 1612 (e.g., an operating system) to facilitate user interaction with device functionality and data. In some embodiments, the client application 1612 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE CORPORATION, and ANDROID OS from GOOGLE INC. These operating systems are merely exemplary of the operating systems that may be used in accordance with the embodiments disclosed herein.

The UI application 1610 aids a user in activating service over-the-air, if applicable, entering message content, viewing received messages, answering/initiating calls, entering/deleting data, entering and setting user IDs and passwords for device access, configuring settings, manipulating address book content and/or settings, multimode interaction, interacting with other applications 1614, and otherwise facilitating user interaction with the client application 1612 and/or the other applications 1614.

In some embodiments, the other applications 1614 include, for example, visual voicemail applications, messaging applications, presence applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The other applications 1614 also include the mRAB decision application 130. The mRAB decision application 130 is configured as described above with reference to the other FIGURES. The applications 1606 are stored in the memory 1608 and/or in a firmware 1616, and are executed by the processor 1604. The firmware 1616 may also store code for execution during device power up and power down operations.

The MD 102 also includes an input/output ("I/O") interface 1618 for the input/output of data such as location information, presence status information, user IDs, passwords, and application initiation (start-up) requests. In some embodiments, the I/O interface 1618 is a hardwire connection such as a universal serial bus ("USB"), mini-USB, micro-USB, audio jack, PS2, IEEE 1394, serial, parallel, Ethernet (RJ48) port, RJ11 port, proprietary port, combinations thereof, or the like. In some embodiments, the MD 102 is configured to synchronize with another device (e.g., a computer) to transfer content stored to/from the MD 102. In some embodiments, the MD 102 is configured to receive updates to one or more of the applications 1606 via the I/O interface 1618. In some embodiments, the I/O interface 1618 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1618 may be used for communications between the MD 102 and a network device or local device instead of, or in addition to, a communications component 1620.

The communications component 1620 interfaces with the processor 1604 to facilitate wireless communications with one or more networks such as the network 100 (shown in FIG. 1) and/or other networks. In some embodiments, other networks include another PLMN while the MD 102 is roaming outside of the network 100. In other embodiments, other networks include networks that utilize non-cellular wireless technologies such as WIFI or WIMAX. In some embodiments, the communications component 1620 includes a multimode communications subsystem for facilitating communications via the network 100 and one or more other networks.

The communications component 1620, in some embodiments, includes one or more transceivers each configured to communicate over the same or a different wireless technology standard. For example, the transceivers of the communications component 1620 may be configured to communicate using Global System for Mobile communications ("GSM"), CDMAONE, CDMA2000, Long Term Evolution ("LTE"), and various other 2G, 2.5G, 3G, 4G, and greater generation technology standards. Moreover, the communications component 1620 may facilitate communications over various channel access methods (which may or may not be used by the aforementioned standards) including, but not limited to, Time Division Multiple Access ("TDMA"), Frequency Division Multiple Access ("FDMA"), W-CDMA, Orthogonal Frequency Division Multiplexing ("OFDM"), Space Division Multiple Access ("SDMA"), and the like. In addition, the communications component 1620 may facilitate data communications using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), and various other current and future wireless data access standards.

In the illustrated embodiment, the communications component 1620 includes a first cellular transceiver 1622 that operates in one mode (e.g., GSM), and an $N^{th}$ cellular transceiver 1624 operates in a different mode (e.g., UMTS). While only two cellular transceivers 1622, 1624 are illustrated, it should be appreciated that more than two transceivers can be included in the communications component 1620.

The illustrated communications component 1620 also includes an alternative communications transceiver 1626 for use by other communications technologies including WIFI, WIMAX, BLUETOOTH, infrared, infrared data association ("IRDA"), near field communications ("NFC"), other RF, combinations thereof, and the like. In some embodiments, the communications component 1620 also facilitates reception from terrestrial radio networks, digital satellite radio networks, internet-based radio service networks, combinations thereof, and the like.

The communications component 1620 processes data from a network such as an internet, an intranet, a home broadband network, a WIFI hotspot, and the like, via an internet service provider ("ISP"), digital subscriber link ("DSL") provider, or broadband provider.

Audio capabilities for the MD 102 may be provided by an audio I/O component 1628 that includes a speaker for the output of audio signals and a microphone to collect audio signals.

The illustrated MD 102 also includes a USIM system 1630 that includes a SIM slot interface 1632 for accommodating a USIM card. In some embodiments, the USIM system 1630 is configured to accept insertion of other SIM cards for access to other network types such as GSM. In other embodiments, the USIM system 1630 is configured to accept multiple SIM cards. In still other embodiments, the USIM system 1630 is configured to accept a universal integrated circuit card ("UICC") with one or more SIM applications stored thereupon.

The MD 102 may also include an image capture and processing system 1634 ("image system"). Photos may be obtained via an associated image capture subsystem of the image system 1634, for example, a camera. The MD 102 may also include a video system 1636 for capturing, processing, recording, and/or modifying video content. Photos and videos obtained using the image system 1634 and the video system 1636, respectively, may be added as message content to a multimedia messaging service ("MMS") message and sent to another mobile device.

The illustrated MD 102 also includes a location component 1638 for sending and/or receiving signals such as global positioning system ("GPS") data, assisted GPS ("A-GPS") data, WIFI/WIMAX and/or cellular network triangulation data, combinations thereof, and the like, for determining a location of the MD 102. The location component 1638 may communicate with the communications component 1620 to retrieve triangulation data for determining a location of the MD 102. In some embodiments, the location component 1638 interfaces with cellular network nodes, telephone lines, satellites, location transmitters and/or beacons, wireless network transmitters and receivers, combinations thereof, and the like. In some embodiments, the location component 1638 includes one or more sensors such as a compass, an accelerometer, and/or a gyroscope to determine the orientation of the MD 102. Using the location component 1638, the MD 102 can generate and/or receive data to identify its location, or transmit data used by other devices to determine the location of the MD 102. The location component 1638 may include multiple components for determining the location and/or orientation of the MD 102.

The illustrated MD 102 also includes a power source 1640, such as one or more batteries and/or other power subsystem (AC or DC). The power source 1640 may interface with an external power system or charging equipment via a power I/O component 1642.

Figure 17:
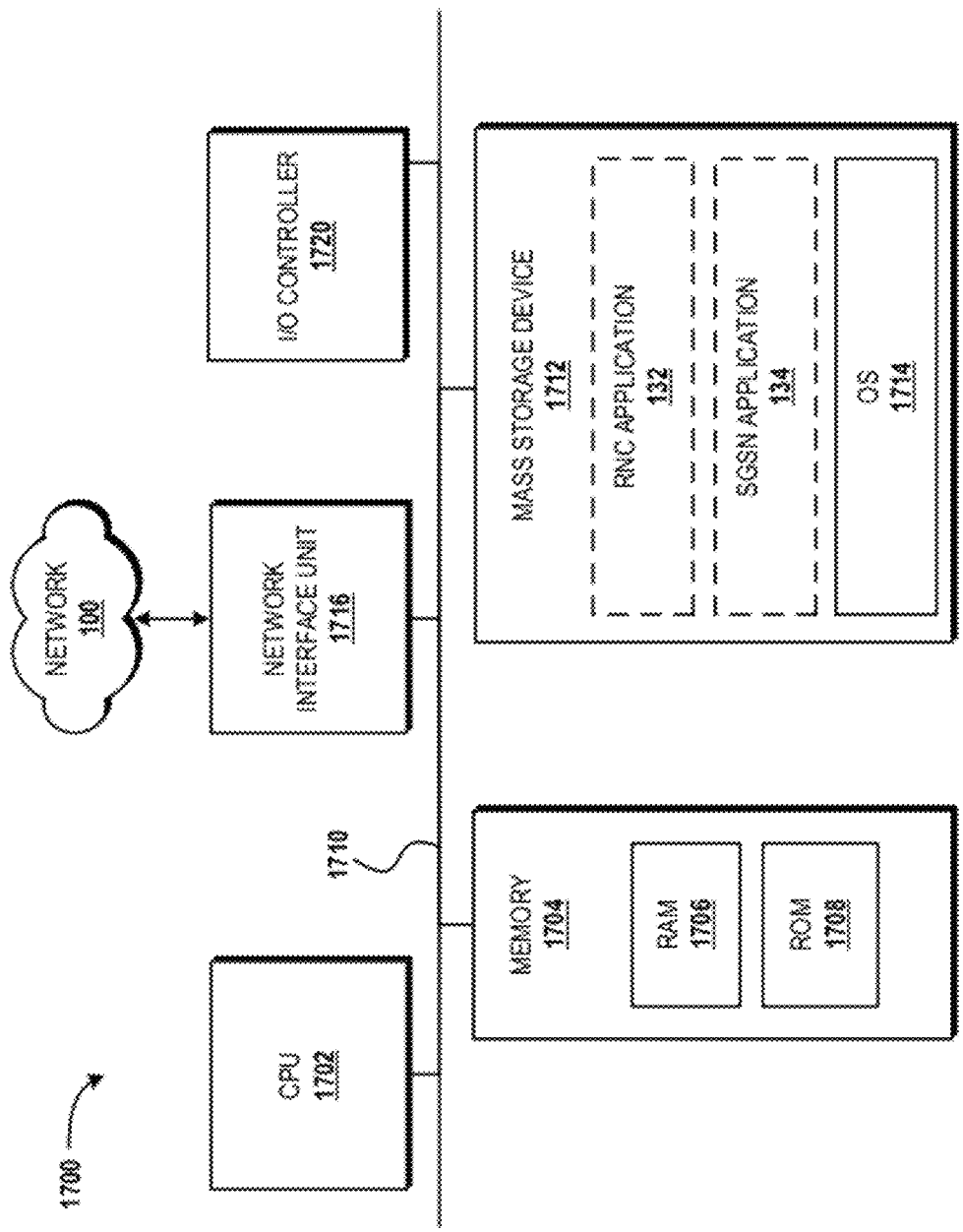
FIG. 17 is a computer architecture diagram illustrating an exemplary computer hardware and software architecture for a computing system capable of implementing aspects of the embodiments presented herein.

Turning now to FIG. 17, an exemplary computer architecture 1700 for a computer system capable of executing the software components described herein will be described in detail. The computer architecture 1700 illustrates an architecture for the RNC 118 and the SGSN 126. The computer architecture 1700 may be utilized to execute any aspects of the software components presented herein.

The illustrated computer architecture 1700 includes a central processing unit 1702 ("CPU"), a system memory 1704, including a random access memory 1706 ("RAM") and a read-only memory ("ROM") 1708, and a system bus 1710 that couples the memory 1704 to the CPU 1702. A basic input/output system containing the basic routines that help to transfer information between elements within the computer architecture 1700, such as during startup, is stored in the ROM 1708. The computer architecture 1700 further includes a mass storage device 1712 for storing an operating system 1714. The mass storage device 1712 also includes one of the RNC application 132 and the SGSN application 134 depending upon whether the computer architecture 1700 is for the RNC 118 or the SGSN 126.

The mass storage device 1712 is connected to the CPU 1702 through a mass storage controller (not shown) connected to the bus 1710. The mass storage device 1712 and its associated computer-readable media provide non-volatile storage for the computer architecture 1700. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1700. For purposes of the claims, the phrase "computer storage medium" and variations thereof, does not include waves, signals, and/or other transitory and/or intangible communication media, per se.

According to various embodiments, the computer architecture 1700 may operate in a networked environment using logical connections to remote computers or network elements through a network such as the network 100. The computer architecture 1700 may connect to the network 100 through a network interface unit 1716 connected to the bus 1710. It should be appreciated that the network interface unit 1716 also may be utilized to connect to other types of networks and remote computer systems. The computer architecture 1700 also may include an input/output controller 1720 for receiving and processing input from a number of other devices, including a keyboard, mouse, electronic stylus, or other input device (not shown in FIG. 17). Similarly, the input/output controller 1720 may provide output to a display screen, a printer, or other type of output device (also not shown in FIG. 17).

It should be appreciated that the software components described herein may, when loaded into the CPU 1702 and executed, transform the CPU 1702 and the overall computer architecture 1700 from a general-purpose computing system into a special-purpose computing system customized to facilitate the functionality presented herein. The CPU 1702 may be constructed from any number of transistors or other discrete circuit elements, which may individually or collectively assume any number of states. More specifically, the CPU 1702 may operate as a finite-state machine, in response to executable instructions contained within the software modules disclosed herein. These computer-executable instructions may transform the CPU 1702 by specifying how the CPU 1702 transitions between states, thereby transforming the transistors or other discrete hardware elements constituting the CPU 1702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1700 in order to store and execute the software components presented herein. It is also contemplated that the computer architecture 1700 may not include all of the components shown in FIG. 17, may include other components that are not explicitly shown in FIG. 17, or may utilize an architecture completely different than that shown in FIG. 17.

Based on the foregoing, it should be appreciated that technologies for selective establishment of radio access bearers to support simultaneous voice and data communications in a mobile telecommunications network have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A mobile device comprising:
   a processor; and
   a memory that stores instructions that, when executed by the processor, cause the processor to perform operations comprising
     receiving a selection of a voice prioritized option,
     establishing, over a voice-only radio access bearer, a voice session with another device,
     collecting, during at least a portion of the voice session, uplink transmit power statistics associated with maintaining the voice session,
     calculating a mean uplink transmit power from the uplink transmit power statistics,
     calculating a standard deviation from the uplink transmit power statistics,
     calculating a value for the mean uplink transmit power plus the standard deviation,
     receiving a data request,
     determining if the value calculated for the mean uplink transmit power plus the standard deviation at least meets a threshold value of uplink transmit power that is insufficient for the mobile device to support a multiple radio access bearer, wherein the multiple radio access bearer simultaneously supports both a voice component of the voice session and a data component of the data request,
     in response to determining that the value does not at least meet the threshold value,
       allowing establishment of the multiple radio access bearer,
       transferring the voice session to the multiple radio access bearer, and
       tearing down the voice-only radio access bearer, and
     in response to determining that the value does at least meet the threshold value, denying establishment of the multiple radio access bearer.

2. The mobile device of claim 1, wherein the mobile device further comprises a display, and wherein the operations further comprise displaying, on the display, the voice prioritized option in context of a first selectable graphical user interface element, and wherein receiving the selection of the voice prioritized option comprises receiving the selection of the voice prioritized option via the first selectable graphical user interface element.

3. The mobile device of claim 2, wherein the voice prioritized option is identified as a maximize voice coverage option.

4. The mobile device of claim 2, wherein the operations further comprise displaying, on the display of the mobile device, a voice only option in context of a second selectable graphical user interface element.

5. The mobile device of claim 4, wherein the operations further comprise displaying, on the display, a normal option in context of a third selectable graphical user interface element.

6. The mobile device of claim 2, wherein the operations further comprise displaying, on the display, a normal option in context of a second selectable graphical user interface element.

7. The mobile device of claim 2, wherein the first selectable graphical user interface element is part of a settings application, a dialer application, or a software widget.

8. The mobile device of claim 1, wherein receiving the selection of the voice prioritized option comprises receiving the selection of the voice prioritized option prior to the voice session being established, during establishment of the voice session, during the voice session, or after the voice session.

9. The mobile device of claim 1, wherein the threshold value of uplink transmit power comprises a percentage of a maximum uplink transmit power.

10. The mobile device of claim 1, wherein the operations further comprise adjusting the threshold value depending upon a radio condition.

11. A mobile device comprising:
    a display;
    a processor; and
    a memory that stores instructions that, when executed by the processor, cause the processor to perform operations comprising
      presenting, on the display, a network settings graphical user interface comprising an input portion and a settings control options portion, the settings control options portion comprising a control settings remotely option,
      receiving a selection of the control settings remotely option,
      based upon receiving the selection of the control settings remotely option, receiving, from a server, a threshold value for a voice priority setting, wherein establishment of a multiple radio access bearer to simultaneously support both a voice component of a voice session and a data component of a data request is denied when the voice session is established and when a value associated with maintaining the voice session at least meets the threshold value,
      storing the threshold value for the voice priority setting in the input portion of the network settings graphical user interface,
      establishing, over a voice-only radio access bearer, the voice session with another device,
      collecting, during at least a portion of the voice session, uplink transmit power statistics for the mobile device associated with maintaining the voice session,
      calculating a mean uplink transmit power from the uplink transmit power statistics,
      calculating a standard deviation from the uplink transmit power statistics,
      calculating a value for the mean uplink transmit power plus the standard deviation,
      receiving the data request,
      determining if the value calculated for the mean uplink transmit power plus the standard deviation at least meets the threshold value,
      in response to determining that the value for the mean uplink transmit power plus the standard deviation does not at least meet the threshold value, allowing establishment of the multiple radio access bearer,
transferring the voice session to the multiple radio access bearer, and
tearing down the voice-only radio access bearer, and
in response to determining that the value for the mean uplink transmit power plus the standard deviation does at least meet the threshold value, denying establishment of the multiple radio access bearer.

12. The mobile device of claim 11, wherein the input portion of the network settings graphical user interface comprises a threshold input box and the voice priority setting comprises a threshold setting.

13. The mobile device of claim 12, wherein the threshold setting is a maximum uplink power threshold setting and the threshold value is a particular maximum uplink power that, when at least met, causes the mobile device to deny data requests.

14. The mobile device of claim 12, wherein the threshold setting and the threshold value are associated with a received signal code power, a ratio of a received energy and an interference level, a carrier-to-noise ratio, or a received signal strength indicator.

15. The mobile device of claim 11, wherein the server is operated by a service provider that is capable of providing a data service that supports data access for the mobile device.

16. The mobile device of claim 12, wherein the operations further comprise:
receiving, from the server, an adjusted threshold value based upon a radio condition known to the server; and
replacing the value for the voice priority setting in the input portion of the network settings graphical user interface with the adjusted threshold value.

17. A mobile device comprising:
a display;
a processor; and
a memory that stores instructions that, when executed by the processor, cause the processor to perform operations comprising
presenting, on the display, a voice prioritized option in context of a first selectable graphical user interface element, wherein the voice prioritized option denies establishment of a multiple radio access bearer to simultaneously support both a voice component of a voice session and a data component of a data request when the voice session is established and when a value associated with maintaining the voice session at least meets a threshold value,
presenting, on the display, a voice only option in context of a second selectable graphical user interface element, wherein the voice only option denies the data request when the voice session is established, whether or not the value associated with maintaining the voice session at least meets the threshold value,
presenting, on the display, a normal option in context of a third selectable graphical user interface element, wherein the normal option allows establishment of the multiple radio access bearer to simultaneously support both the voice component of the voice session and the data component of the data request when the voice session is established, whether or not the value associated with maintaining the voice session at least meets the threshold value,
receiving a selection of the voice prioritized option via the first selectable graphical user interface element,
establishing, over a voice-only radio access bearer, the voice session with another device,
collecting, during at least a portion of the voice session, uplink transmit power statistics for the mobile device associated with maintaining the voice session,
calculating a mean uplink transmit power from the uplink transmit power statistics,
calculating a standard deviation from the uplink transmit power statistics,
calculating a value for the mean uplink transmit power plus the standard deviation,
receiving the data request,
determining if the value calculated for the mean uplink transmit power plus the standard deviation at least meets the threshold value,
in response to determining that the value for the mean uplink transmit power plus the standard deviation does not at least meet the threshold value,
allowing establishment of the multiple radio access bearer,
transferring the voice session to the multiple radio access bearer, and
tearing down the voice-only radio access bearer, and
in response to determining that the value for the mean uplink transmit power plus the standard deviation does at least meet the threshold value, denying establishment of the multiple radio access bearer.

* * * * *